(12) United States Patent
Skoutellas et al.

(10) Patent No.: US 12,466,525 B2
(45) Date of Patent: Nov. 11, 2025

(54) CHAIN ANCHOR REAL-TIME COMPUTING AND HYDRO-MECHANICS INTEGRATED DRAG IDENTIFIER

(71) Applicants: Orestis Skoutellas, Nicosia (CY); Mario Ferre, Naples (IT); Jacob David Bendell, Wichita, KS (US); Benjamin Caleb Abt, Bastrop, TX (US); Nicholas James Anderson, New York, NY (US)

(72) Inventors: Orestis Skoutellas, Nicosia (CY); Mario Ferre, Naples (IT); Jacob David Bendell, Wichita, KS (US); Benjamin Caleb Abt, Bastrop, TX (US); Nicholas James Anderson, New York, NY (US)

( * ) Notice: Subject to any disclaimer, the term of this patent is extended or adjusted under 35 U.S.C. 154(b) by 105 days.

(21) Appl. No.: 18/614,237

(22) Filed: Mar. 22, 2024

(65) Prior Publication Data
US 2025/0313315 A1    Oct. 9, 2025

(51) Int. Cl.
*B63B 79/20* (2020.01)
*B63B 79/10* (2020.01)
*B63B 21/00* (2006.01)

(52) U.S. Cl.
CPC .............. *B63B 79/20* (2020.01); *B63B 79/10* (2020.01); *B63B 2021/009* (2013.01); *B63B 2201/16* (2013.01)

(58) Field of Classification Search
CPC ... B63B 79/20; B63B 79/10; B63B 2021/009; B63B 2201/16
USPC ..................... 348/81, 148, 320; 114/294, 328
See application file for complete search history.

(56) References Cited

U.S. PATENT DOCUMENTS

| | | | |
|---|---|---|---|
| 11,468,596 B2* | 10/2022 | Tsuchiya | G06T 3/4038 |
| 11,505,286 B2* | 11/2022 | Potts | B63B 21/22 |
| 11,543,621 B2* | 1/2023 | Fukuyama | H10F 39/12 |
| 12,089,427 B2* | 9/2024 | Kawaguchi | H10F 39/191 |
| 12,193,418 B2* | 1/2025 | Messana | B25J 19/021 |
| 2014/0041569 A1* | 2/2014 | Couch, III | B63B 23/40 |
| | | | 114/259 |
| 2015/0116496 A1* | 4/2015 | Ottaviano | B63B 21/227 |
| | | | 348/148 |
| 2023/0147120 A1* | 5/2023 | Kapteijn | B63B 1/38 |
| | | | 114/67 A |

(Continued)

OTHER PUBLICATIONS

Ocean Navigator, "High-tech anchor watch", 2021, Maritime Publishing, 5 pages.

(Continued)

*Primary Examiner* — Helen Shibru
(74) *Attorney, Agent, or Firm* — Duane Morris LLP

(57) ABSTRACT

In some embodiments, a monitoring system may include an enclosure defining a void. The enclosure may be configured to be mounted to a floating vessel. The monitoring system may also include a camera system disposed within the void and coupled to the enclosure. The camera system may be configured to transmit a video feed of an anchor chain to at least a first computing device. The first computing device may be configured to analyze the video feed to determine a drag risk score with a computer vision model based at least in part on an angle of the anchor chain. The first computing device may be configured to determine a collision risk score. Other systems and methods are also disclosed.

20 Claims, 20 Drawing Sheets

(56) References Cited

U.S. PATENT DOCUMENTS

| | | | |
|---|---|---|---|
| 2023/0249787 A1* | 8/2023 | Spencer | G05D 1/0038 |
| | | | 114/31 |
| 2024/0177503 A1* | 5/2024 | Peng | G06V 20/58 |
| 2024/0339037 A1* | 10/2024 | Park | G06V 20/52 |
| 2025/0130046 A1* | 4/2025 | Kiefer | G06V 10/82 |

OTHER PUBLICATIONS

Deep Blue Marine DB-100 Anchor Alert Boat Marine Anchor Movement Alarm Display Product Information, 3 pages.

VisionAnchor Smart Anchoring System Product Information, 8 pages.

"VisionAnchor: This award-winning design could be the anchor of the future" Sep. 15, 2021, Motorboat & Yachting Magazine, website: <https://www.mby.com/gear/visionanchor-award-winning-design-anchor-future-117144>.

VisionAnchor How It Works animation 2021, Youtube website video, <https://www.youtube.com/watch?v=f5r8Fp8PMtg>.

* cited by examiner

CHAIN ANCHOR REAL-TIME COMPUTING AND HYDRO-MECHANICS INTEGRATED DRAG IDENTIFIER

FIELD OF DISCLOSURE

The disclosed systems and methods relate to the field of digital monitoring. More particularly, the disclosed systems and methods are directed to autonomous monitoring of maritime operations.

BACKGROUND

Anchors are used by maritime vessels to maintain their position without the need of excessive use of ship propulsion. For example, commercial ships may be required to anchor outside of a port for a day or more before being allowed to enter the port. While deployed, the anchor may drag across the ocean floor based on various conditions, such as current, tide, wind, etc. Conventionally, a watchstander, such as a deckhand on a commercial vessel is responsible to monitor the anchor, which he typically does once every hour as part of his round. These anchor watchstanders may be required to rotate with another watchstander at predetermined times, such as every four hours. The anchor watchstander monitors anchor parameters, such as the direction of the anchor relative to the vessel and the slack in the anchor chain, which can indicate a risk that the anchor may drag given the right conditions. For example, slack in the anchor chain creates a risk that the vessel can drift from its anchored position, which may cause the vessel to ground on the ocean floor or crash into other vessels around them. Since the anchor watchstander is directed to check on the anchor at predetermined times, at most frequent being every fifteen minutes, the anchor watchstander may not be able to detect changes with sufficient time to prevent the vessel from grounding or crashing.

SUMMARY

In some embodiments, a monitoring system may include an enclosure defining a void. The enclosure may be configured to be mounted to a floating vessel. The monitoring system may also include a camera system disposed within the void and coupled to the enclosure. The camera system may include a motor having a shaft, a lens, a first gear operatively coupled to the shaft, a second gear operatively coupled to the lens, wherein the first gear and the second gear are engaged, and at least one camera having a second computing device and disposed behind the lens. The lens may be configured to spin at 900 revolutions per minute (RPM) or more, facilitated by the motor, the first gear, and the second gear, to remove moisture from the lens. The camera system may be configured to transmit a video feed of an anchor chain to at least a first computing device. The first computing device may be configured to analyze the video feed to determine a drag risk score with a computer vision model based at least in part on an angle of the anchor chain. The first computing device may be configured to determine a collision risk score.

In some embodiments, an anchor monitoring system may include a monitoring system having a camera system configured to monitor an anchor of a vessel. The anchor monitoring system may also include a management device communicatively coupled to the monitoring system. The anchor monitoring system may also include a server communicatively coupled to the monitoring system and the camera system. The server may be configured to determine a drag risk score of an anchor based on a computer vision model.

In some embodiments, a method may include receiving a video feed of an anchor chain from a monitoring system on a vessel. The method may also include processing the video feed to determine one or more anchor parameters. The method may also include determining a drag risk score based at least in part on the one or more anchor parameters, facilitated by a computer vision model.

In some embodiments, a non-transitory, computer-readable storage medium storing one or more sequences of instructions which when executed may cause one or more processors to perform receiving a video feed of an anchor chain from a monitoring system on a vessel. The instructions may cause one or more processors to perform processing the video feed to determine one or more anchor parameters. The instructions may cause one or more processors to perform determining a drag risk score based at least in part on the one or more anchor parameters, facilitated by a computer vision model.

BRIEF DESCRIPTION OF THE DRAWINGS

The features and advantages of the present disclosure will be more fully disclosed in, or rendered obvious by, the following detailed descriptions of example embodiments. The detailed descriptions of the example embodiments are to be considered together with the accompanying drawings wherein like numbers refer to like parts and further wherein.

Figure 1:
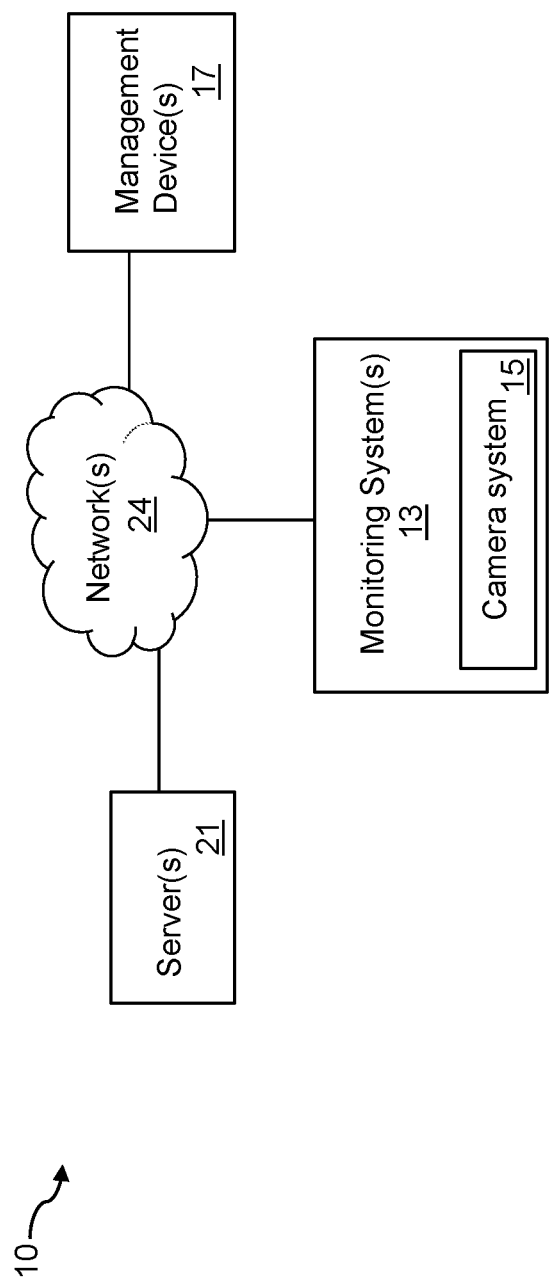
FIG. 1 illustrates one example of an anchor monitoring system in accordance with some embodiments.
Figure 2:
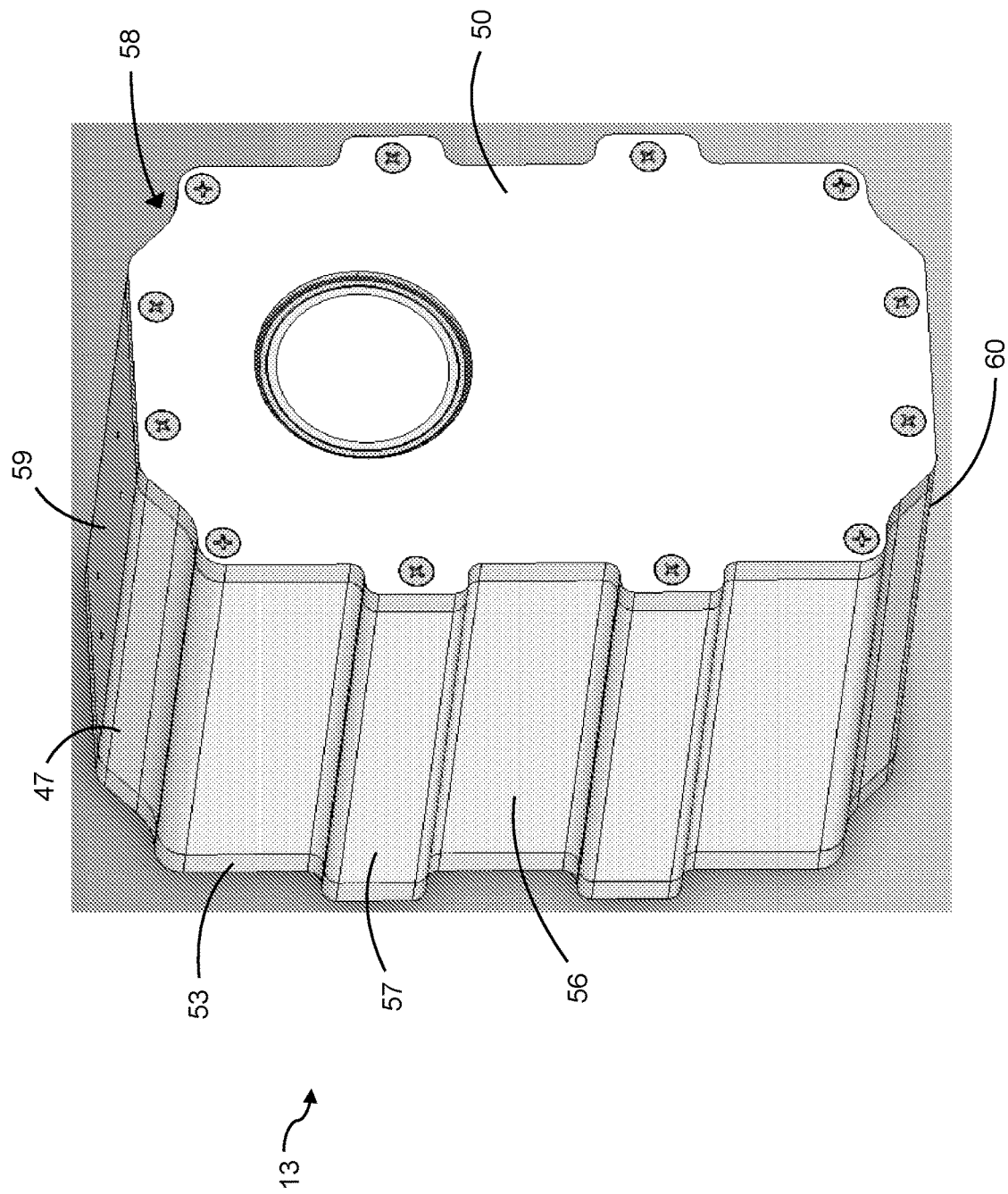
FIG. 2 illustrates an isometric view of one example of a monitoring system in accordance with some embodiments.

While the present disclosure is susceptible to various modifications and alternative forms, specific embodiments have been shown by way of example in the drawings and will be described in detail herein. It should be understood, however, that the present disclosure is not intended to be limited to the particular forms disclosed. Rather, the present disclosure is to cover all modifications, equivalents, and alternatives falling within the spirit and scope of the disclosure as defined by the appended claims.

DETAILED DESCRIPTION

This description of the exemplary embodiments is intended to be read in connection with the accompanying drawings, which are to be considered part of the entire written description. It should be understood, however, that the present disclosure is not intended to be limited to the particular forms disclosed and that the drawings are not necessarily shown to scale. Rather, the present disclosure covers all modifications, equivalents, and alternatives that fall within the spirit and scope of these exemplary embodiments. In the description, relative terms such as "lower," "upper," "horizontal," "vertical," "above," "below," "up," "down," "top," and "bottom" as well as derivatives thereof (e.g., "horizontally," "downwardly," "upwardly," etc.) should be construed to refer to the orientation as then described or as shown in the drawing under discussion. These relative terms are for convenience of description and do not require that the apparatus be constructed or operated in a particular orientation. Terms concerning attachments, coupling and the like, such as "connected" and "interconnected" refer to a relationship wherein structures are secured or attached to one another either directly or indirectly through intervening structures, as well as both movable or rigid attachments or relationships, unless expressly described otherwise. The terms "couple," "coupled," "operatively coupled," "operatively connected," and the like should be broadly understood to refer to connecting devices or components together either mechanically, or otherwise, such that the connection allows the pertinent devices or components to operate with each other as intended by virtue of that relationship.

The present disclosure relates to an anchor monitoring system configured to monitor one or more maritime operations. For example, the anchor monitoring system of the present disclosure may monitor a deployed anchor of a vessel to determine a risk of the anchor dragging along the ocean floor. The anchor monitoring system may relay this risk to a user of the anchor monitoring system so that the user can evaluate the risk and adjust the anchor and/or the vessel as necessary.

The anchor monitoring system may replace the need to have a dedicated anchor watchstander, reducing the workload of those onboard the vessel. The anchor monitoring system may also minimize excess propulsion by a vessel at anchorage by catching anchor drag risks early enough to adjust the anchor as needed, preventing the need to use the vessel's propulsion system to reposition. By catching the anchor issues early and adjusting the anchor, the vessel minimizes the use of fuel while at anchor. The anchor monitoring system also provides early warning of anchor issues, preventing the anchor from dragging across the ocean floor and causing damage. The warnings by the anchor monitoring system also allow action to be taken early to prevent the vessel from grounding or crashing with another vessel.

In some embodiments, the anchor monitoring system may also be configured to identify personnel issues and casualties associated with the vessel. For example, the anchor monitoring system may be configured to identify personnel trying to gain unauthorized access to the vessel by attempting to climb the chain, such as pirates for example, and alert a user of the anchor monitoring system of the issue. The anchor monitoring system may also be configured to identify a person that has gone overboard, given they are visible in the camera's field of view, and alert a user of the monitoring system of the person overboard.

Referring now to the figures, FIG. 1 illustrates one example of an anchor monitoring system 10 in accordance with some embodiments. The anchor monitoring system 10 may include one or more monitoring systems 13 each having a camera system 15, one or more management devices 17, and one or more servers 21, which are communicatively coupled through direct physical connections (e.g., wired) or via a wireless connection to network 24.

In some embodiments, a monitoring system 13 is configured to monitor maritime operations of a vessel, facilitated by a camera system 15. The camera system 15 may transmit a video feed to the server 21 and/or a management device 17 for processing. A monitoring system 13 can comprise any suitable enclosure having a camera system 15 that is communicatively coupled to the server 21 and a management device 17 through the network 24.

In some embodiments, a management device 17 hosts and executes various computer applications, such as a web browser, within which a web application can be running. A management device 17 can be configured to communicate with the server 21 in automatically performing activities involving communication with remote computer applications. A management device 17 can be configured to communicate with the server 21 or an application of server 21, such as a computer vision model. Server 21 or an application of server 21 can be configured to notify a user of a management device 17 of actual or pending maritime operations casualties (e.g., grounding, collision, anchor drag risk, etc.). A management device 17 can comprise a desktop computer, laptop computer, tablet computer, smartphone, wearable device, or some other suitable computing device.

In some embodiments, the server 21 hosts and executes various computer applications configured to evaluate a video feed for a specific object and determine one or more parameters of that object, or a web server that receives a video feed and responds to the video feed from a corresponding client. In some embodiments, the server 21 manages one or more databases of information. As an example, the database can include one or more anchorages, which may include the type of vessel (or even the specific vessel), the anchor parameters (e.g., anchor weight, chain size, etc.), and the ocean conditions (e.g., weather, water temperature, salinity, current, ocean floor topography based on the geo-location, etc.). The server 21 can comprise any computing facility with sufficient computing power in data processing, data storage, and network communication for performing the above-mentioned functions.

The network 24 can be implemented by any medium or mechanism that provides for the exchange of data between the various elements of FIG. 1. Examples of the network 24 include, without limitation, one or more of a cellular network, communicatively coupled with a data connection to the computing devices over a cellular antenna, a near-field communication (NFC) network, a Local Area Network (LAN), a Wide Area Network (WAN), or the Internet, a terrestrial or satellite link, just to provide a few non-limiting examples.

As illustrated in FIGS. 2-6, the monitoring system 13 may include an enclosure 47 having a front member 50, a back member 53, and a case 56. The case 56 may include a first side 57, a second side 58, a top side 59, and a bottom side 60. In some embodiments, the case 56 may be formed as one piece. In other embodiments, the case 56 may be formed in one or more discrete pieces. The monitoring system 13 is configured to be coupled to a vessel in any suitable location to monitor the anchor chain of the vessel. For example, the monitoring system may be coupled to the vessel in an orientation that is above, below, or beside the anchor chain or hawse pipe.

Figure 3:
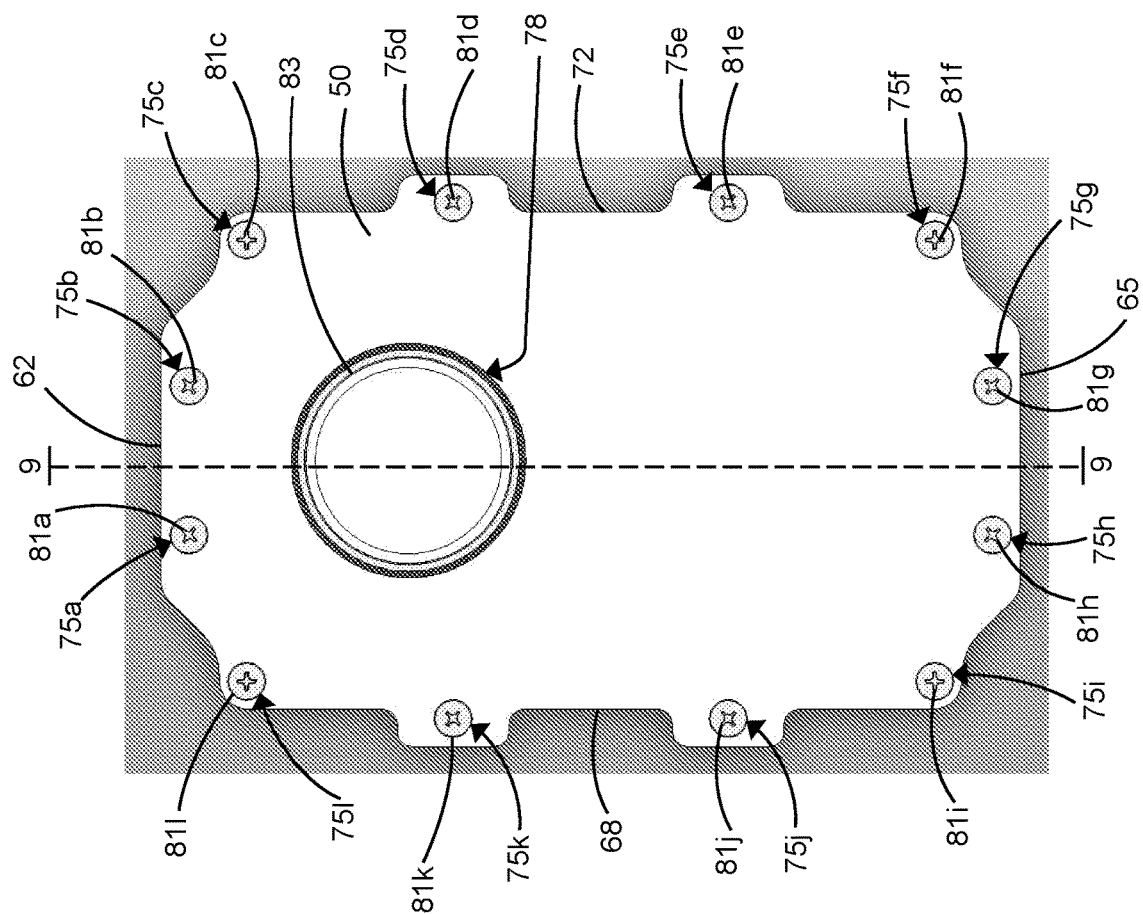
FIG. 3 illustrates a front view of one example of a monitoring system in accordance with some embodiments.

As illustrated in FIG. 3, front member 50 extends between a top portion 62, a bottom portion 65, a left side 68, and a right side 72. The front member 50 may define one or more apertures 75*a-l* and at least one slot 78. The one or more apertures 75 are sized and configured to receive one or more respective fasteners 81*a*-1. The one or more fasteners 81*a-l* are configured to couple the front member 50 to the case 56. The fasteners 81*a*-1 may be any suitable fastener, such as a nail, a pin, a screw, a rivet, or any other suitable fastener such as an adhesive. For example, the fasteners 81*a-l* may be zirconium nickel (ZrNi) screws. The at least one slot 78 is sized and configured to receive a lens 83 of the camera system 15 as discussed in more detail below.

The front member 50 may be made of any suitable material, such as metal (e.g., aluminum), metal alloy, plastic, vinyl, wood, etc. In some embodiments, the front member 50 is capable of being 3D printed (e.g., additively manufactured), and may include materials such as ABS (acrylonitrile butadiene styrene), PLA (polylactic acid), PETG (polyethylene terephthalate glycol), POM (Polyoxymethylene), nylon, TPU (thermoplastic polyurethane), resin, and other suitable thermoplastics and thermosetting plastics. In some embodiments, front member 50 is the same material as the back member 53 and the case 56. In other embodiments, front member 50 is a different material than the back member 53 and/or the case 56.

Figure 4B:
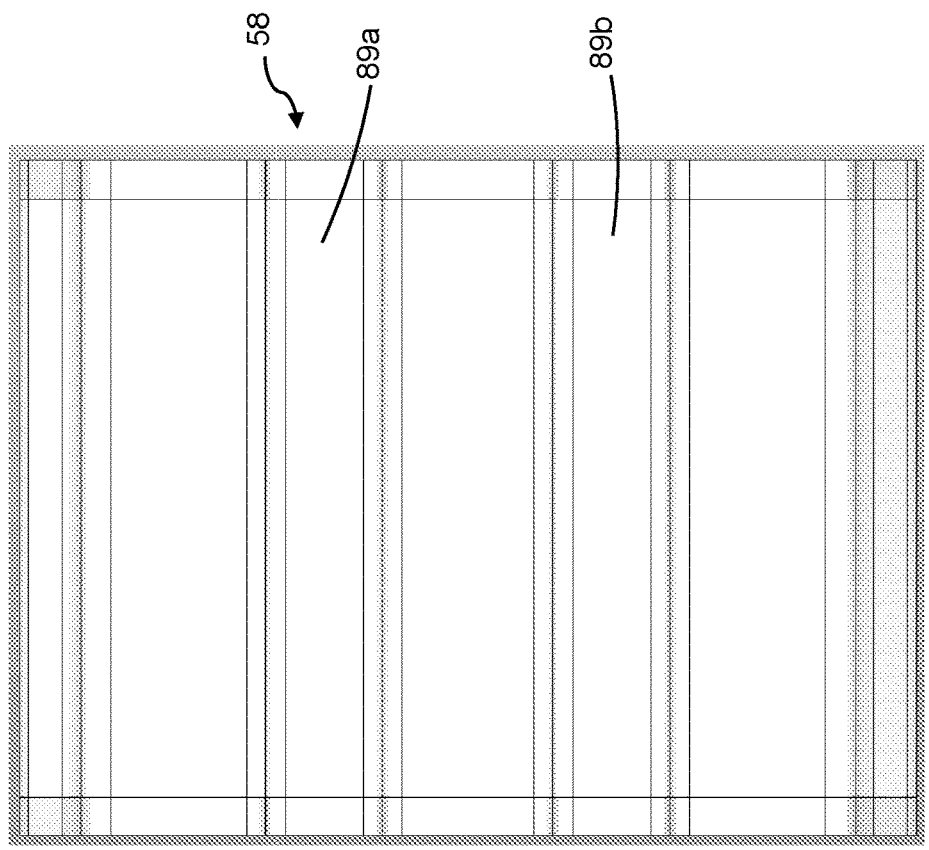
FIG. 4B illustrates a right side view of one example of a monitoring system in accordance with some embodiments.
Figure 4A:
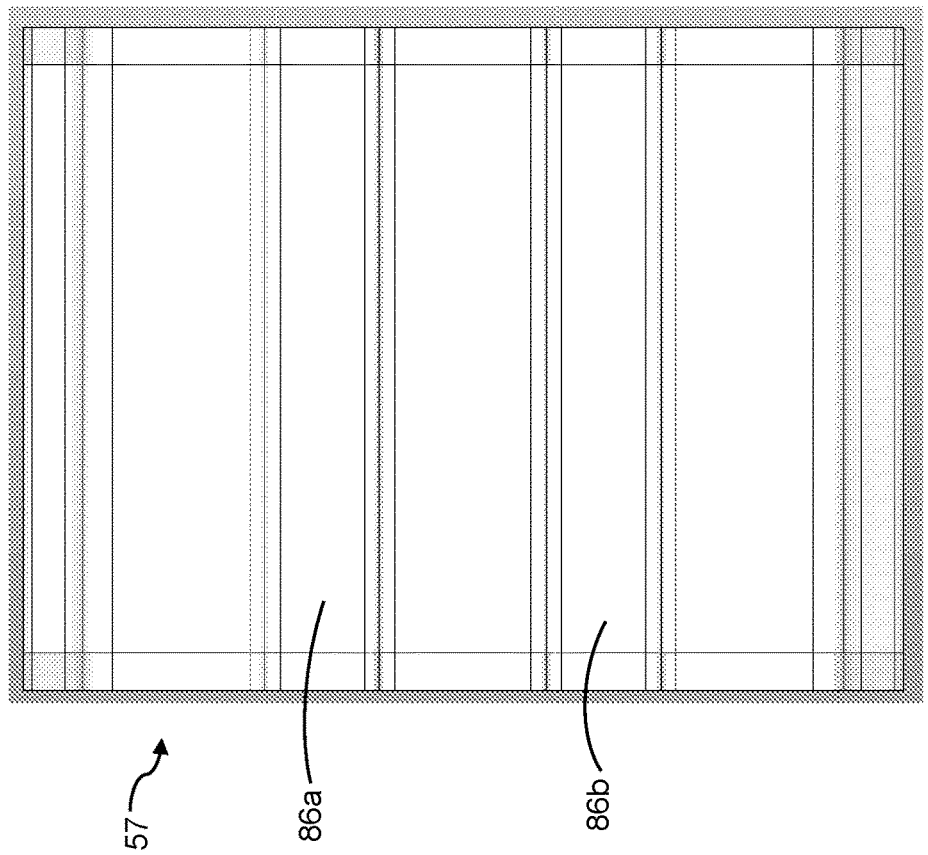
FIG. 4A illustrates a left side view of one example of a monitoring system in accordance with some embodiments.

Referring now to FIGS. 4A-4B, the first side 57 may include one or more ridges 86*a-b*. The second side 58 of the case 56 may also include one or more ridges 89*a-b*. In some embodiments, the ridges 86*a-b* and 89*a-b* may be reinforced for shock hardening. In some embodiments, the ridges 86*a-b* and 89*a-b* may be configured to fit within a press fit aperture on the vessel to couple the monitoring system 13 to the vessel.

Figure 5B:
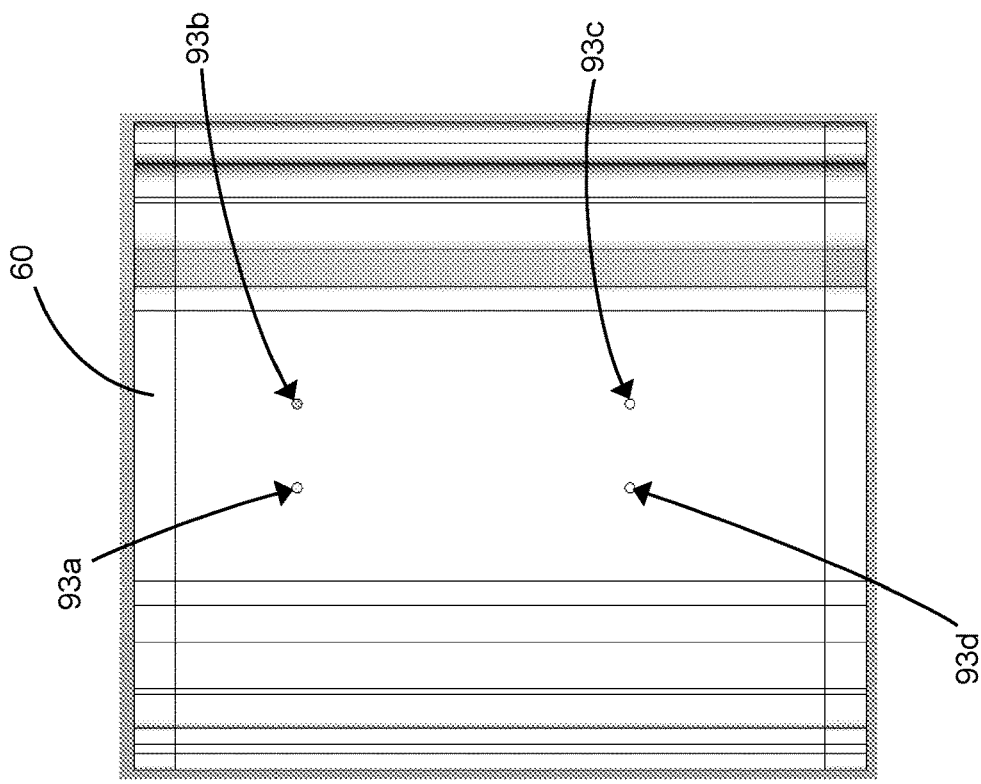
FIG. 5B illustrates a bottom view of one example of a monitoring system in accordance with some embodiments.
Figure 5A:
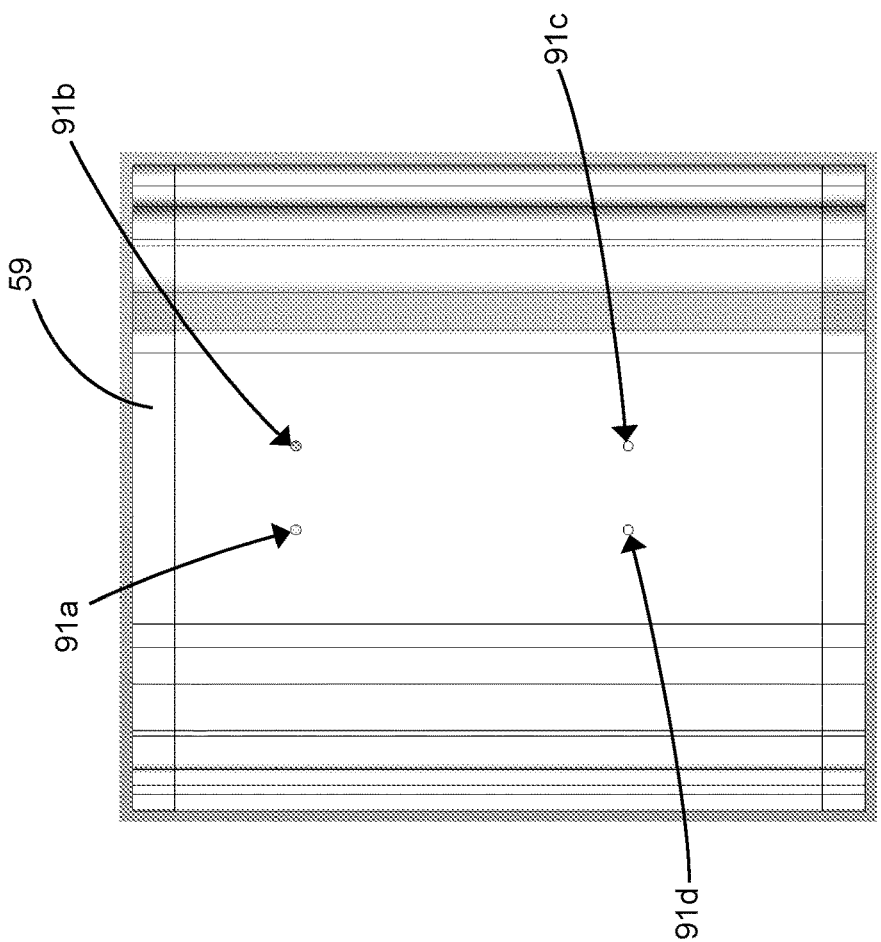
FIG. 5A illustrates a top view of one example of a monitoring system in accordance with some embodiments.

Referring now to FIGS. 5A-5B, the top side 59 may define one or more holes 91*a-d*. The bottom side 60 may define one or more holes 93*a-d*. The holes 91*a-d* and 93*a-d* may be sized and configured to receive a fastener, similar to fasteners 81*a*-1, to couple the monitoring system 10 to the vessel, such as with a bracket attached to the top side 59 and the vessel and a bracket attached to the bottom side 60 and the vessel.

As mentioned above, the case 56 (e.g., the first side 57, the second side 58, top side 59, and the bottom side 60) may be formed as one piece or may be formed as separate, discrete pieces. The case 56 may be made of any suitable material, such as metal (e.g., aluminum), metal alloy, plastic, vinyl, wood, etc. In some embodiments, the case 56 is capable of being 3D printed (e.g., additively manufactured), and may include materials such as ABS (acrylonitrile butadiene styrene), PLA (polylactic acid), PETG (polyethylene terephthalate glycol), POM (Polyoxymethylene), nylon, TPU (thermoplastic polyurethane), resin, and other suitable thermoplastics and thermosetting plastics. In some embodiments, the case 56 is the same material as the front member 50 and the back member 53. In other embodiments, the case 56 is a different material than the front member 50 and/or the back member 53. In some embodiments, a seal, such as a neoprene seal is disposed between the front member 50 and the case 56 and/or the back member 53 and the case 56 to prevent moisture from entering the case 56.

Figure 6:
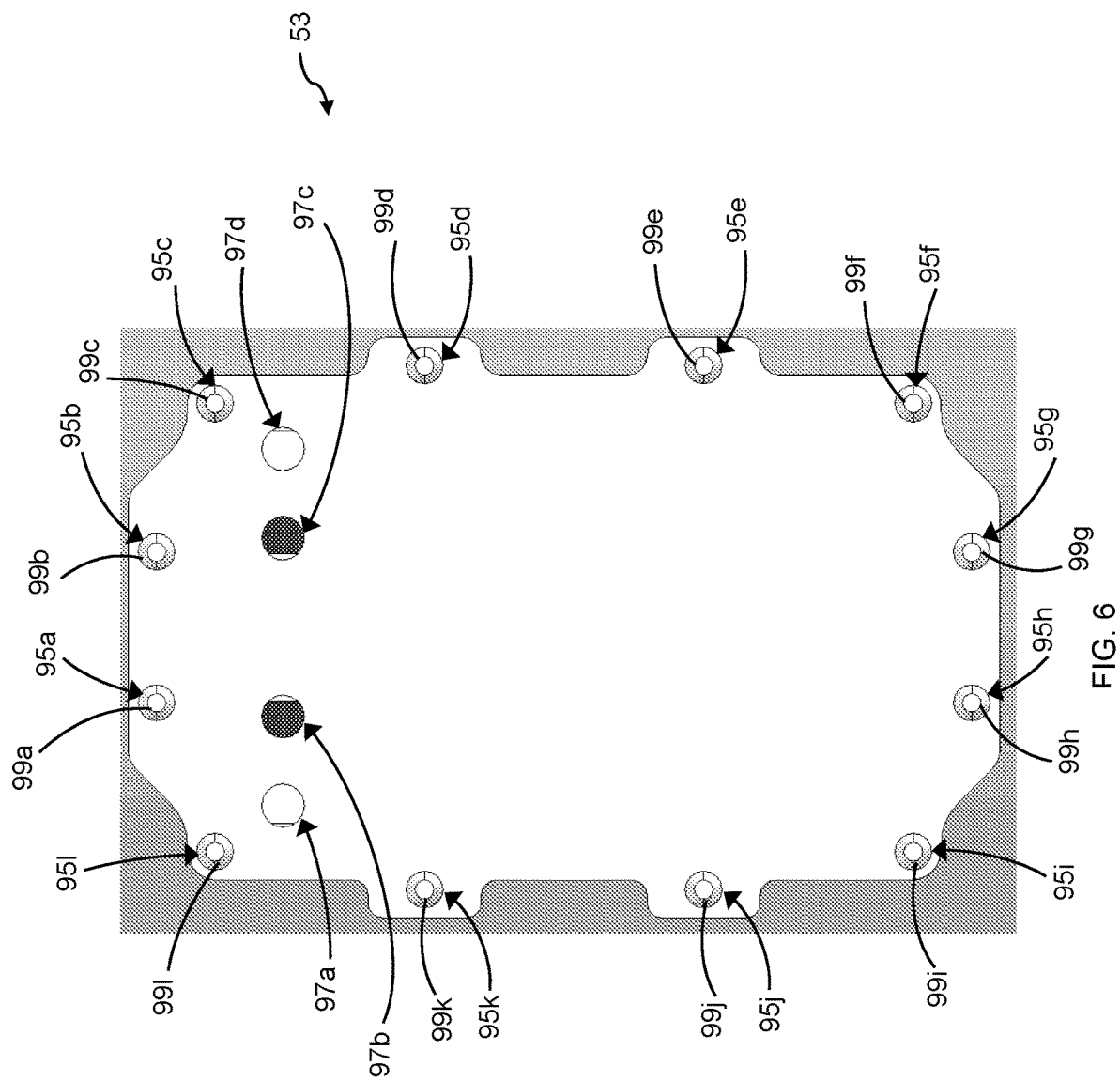
FIG. 6 illustrates a back view of one example of a monitoring system in accordance with some embodiments.

As illustrated in FIG. 6, the back member 53 defines one or more apertures 95*a*-1 and one or more slots 97*a-d*. The one or more apertures 95*a-l* are sized and configured to receive respective fasteners 99*a*-1. The fasteners 99*a-l* are configured to couple the back member 53 to the case 56. The fasteners 99*a-l* may be any suitable fastener, such as a nail, a pin, a screw, a rivet, or any other suitable fastener such as an adhesive. For example, the fasteners 99*a*-1 may be ZrNi screws. In some embodiments, the fasteners 81*a*-1 are configured to be received through the case 56 and into the apertures 95*a-l* of back member 53, coupling the enclosure 47 together. The one or more slots 97*a-d* are sized and configured to receive power connections to connect the monitoring system 13 to the vessel power system, as will be discussed in more detail below. In some embodiments, the power connections to the vessel power system are waterproof connections, such as one or more waterproof Amphenols. It will be appreciated that one or more batteries may be used instead of direct power connections to the vessel power system.

The back member 53 may be made of any suitable material, such as metal (e.g., aluminum), metal alloy, plastic, vinyl, wood, etc. In some embodiments, the back member 53 is capable of being 3D printed (e.g., additively manufactured), and may include materials such as ABS (acrylonitrile butadiene styrene), PLA (polylactic acid), PETG (polyethylene terephthalate glycol), POM (Polyoxymethylene), nylon, TPU (thermoplastic polyurethane), resin, and other suitable thermoplastics and thermosetting plastics. In some embodiments, the back member 53 is the same material as the front member 50 and the case 56. In other embodiments, the back member 53 is a different material than the front member 50 and/or the case 56.

In some embodiments, the enclosure 47 is configured to protect the internal components from adverse conditions, such as a weather (e.g., rain, ice, snow, waves, etc.), condensation, saltwater corrosion, and extreme temperature swings. For example, the enclosure 47 may be rated with an ingress protection (IP) rating of IP67 for waterproofing and IP69K for dustproofing. These ratings are facilitated by the material choices for the enclosure 47 (e.g., acetal homopolymer), seals (e.g., neoprene seals, shaft seals, etc.), Amphenol sine connectors to the enclosure 47, and moisture removal applications, such as silica packets disposed within the enclosure 47, just to provide a few examples.

Figure 7:
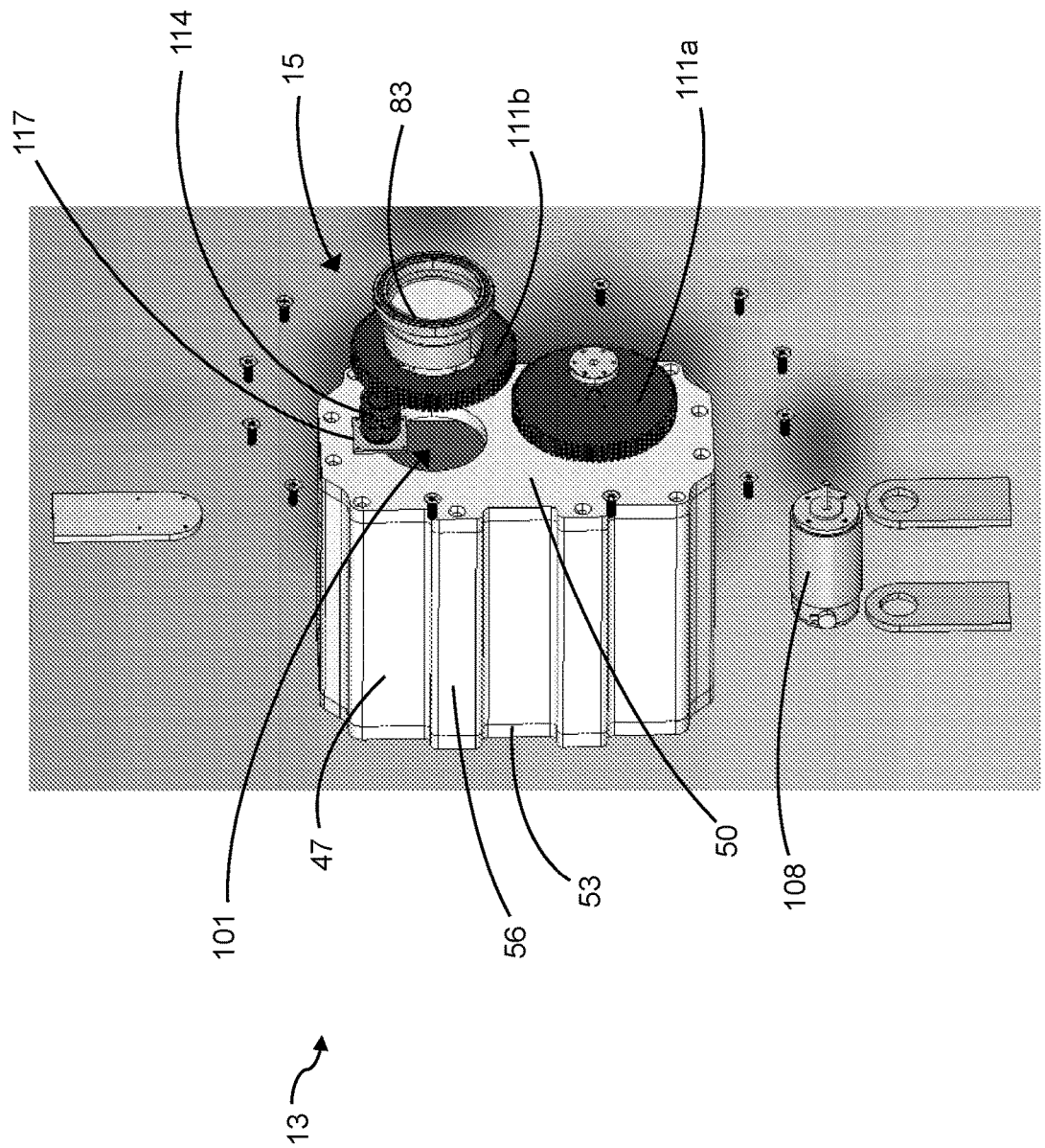
FIG. 7 illustrates an exploded view of one example of a monitoring system in accordance with some embodiments.

FIG. 7 illustrates an exploded view of one example of a monitoring system 13 in accordance with some embodiments. The monitoring system 13 may include a camera system 15. When coupled together, the front member 50, the back member 53, and the case 56 define a void 101. The void 101 is sized and configured to receive the camera system 15. The camera system 15 may include a motor 108, one or more gears, such as a shaft gear 111a and a lens gear 111b, at least one camera 114, a computing device 117, and the lens 83.

Figure 8:
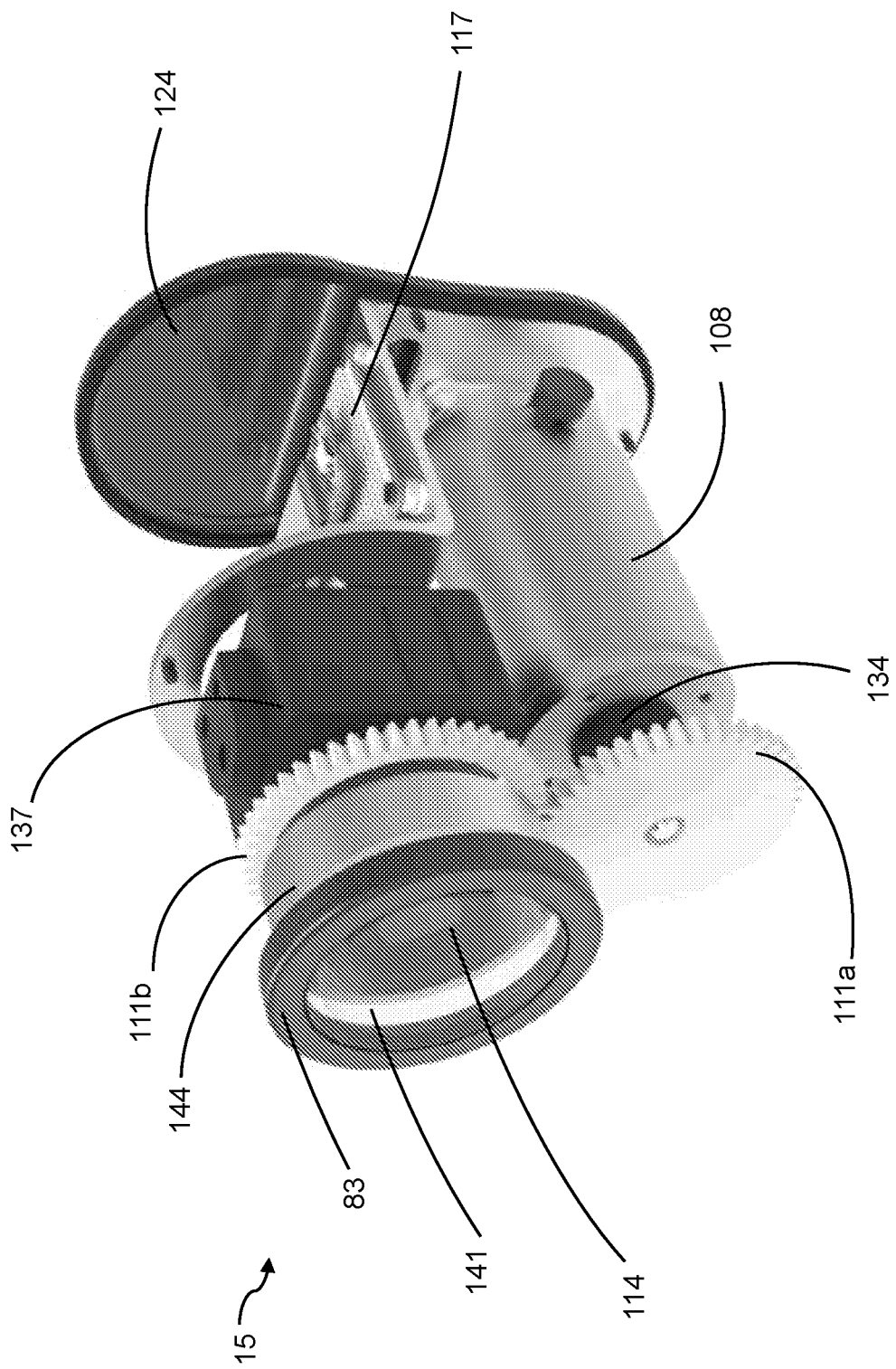
FIG. 8 illustrates an isometric view of one example of a camera system of a monitoring system in accordance with some embodiments.
Figure 9:
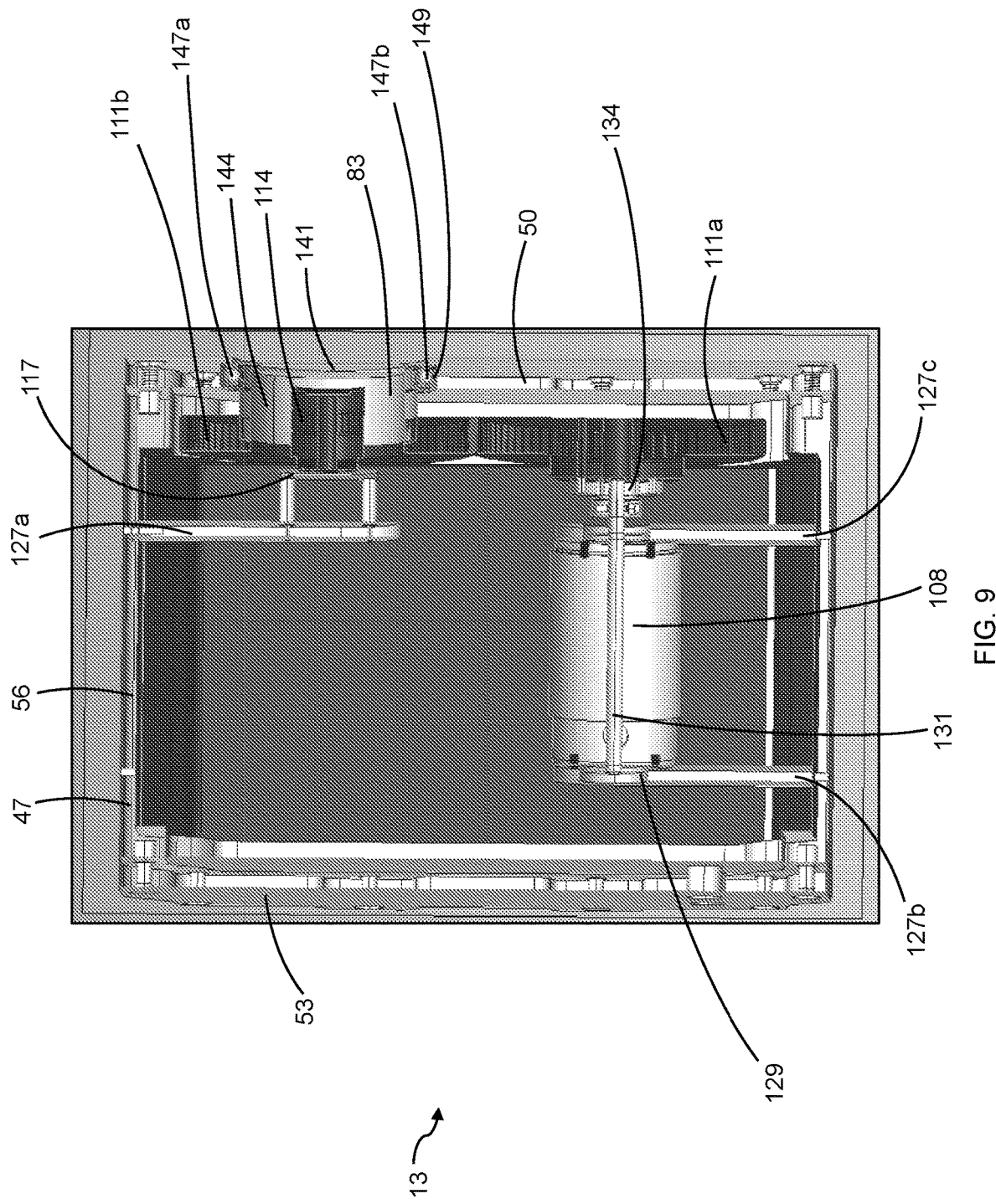
FIG. 9 illustrates a cross-sectional view of one example of a monitoring system along axis 9-9 shown in FIG. 3.

As illustrated in FIG. 8, the camera system 15 may be mounted to a frame 124 within the enclosure 47. However, it will be appreciated that the camera system 15 may be mounted inside the enclosure 47 with one or more frames 127a-c as illustrated in FIG. 9. For example, the camera 114 and computing device 117 may be mounted to the top side 59 of the case 56 with the frame 127a and the motor 108 may be mounted to the bottom side 60 of the case 56 with the frames 127b-c. It should be understood that the camera system 15 may be mounted within the enclosure 47 in other orientations and through other means beyond the use of the one or more frames 127a-c, such as by directly mounting to the enclosure 47. For example, the enclosure 47 may be formed with integral mounting means for supporting and mounting the camera system 15.

Continuing to refer to FIGS. 8-9, the motor 108 may include an adjustment standoff 129, a shaft 131, and an adapter 134. The adjustment standoff 129 may be configured to facilitate movement of the shaft 131 in one or more axes. For example, the adjustment standoff 129 may be configured to move the shaft 131 in a first axis that is towards the top side 59 or the bottom side 60 of the case 56. The adjustment standoff 129 may also be configured to move the shaft 131 in a second axis that is towards the first side 57 or the second side 58 of the case 56. The adjustment standoff 129 may also be configured to move the shaft 131 in a third axis that is towards the front member 50 or the back member 53.

The shaft 131 may be turned by the operation of the motor 108. The shaft 131 may be coupled to an adapter 134 that is coupled to the shaft gear 111a. The shaft gear 111a may include one or more teeth. The lens gear 111b may be coupled to the lens 83. The lens gear 111b may include one or more teeth. In some embodiments, the one or more teeth of the shaft gear 111a are sized and configured to engage the one or more teeth of the lens gear 111b. The gears 111a-b are made of any suitable material, such as a metal, metal alloy, plastic, etc. For example, the gears 111a-b may be made of a high-density polyethylene plastic.

During operation, the motor 108 may be configured to drive the shaft 131, which turns the gears 111a-b to make the lens 83 spin. Advantageously, the lens 83 is configured to spin, facilitated by the motor 108, to keep moisture from obscuring visibility of the camera 114 disposed behind the lens 83. In some embodiments, the motor 108 may be a direct current (DC) motor. For example, the motor 108 may be a 12 volts DC motor capable of turning at 8,574 revolutions per minute (RPM) with a torque of 2.62 inch-ounce. However, other motors may be used, such as an alternating current (AC) motor. It will be appreciated that various combinations of voltage rating, RPM, and torque settings may be used for motor 108.

In some embodiments, the camera 114 may include an adapter 137 that facilitates the ability to provide adjustment standoffs if necessary. Meaning, the adapter 137 may be configured to adjust the camera 114 in one or more axes. For example, the adapter 137 may be configured to adjust the camera 114 in a first axis that is towards the top side 59 or bottom side 60 of the case 56. The adapter 137 may be configured to adjust the camera 114 in a second axis that is towards the first side 57 or the second side 58 of the case 56. The adapter 137 may be configured to adjust the camera 114 in a third axis that is either closer to or away from the lens 83. In some embodiments, the camera 114 is an IMX 477 infrared (IR) camera assembly. However, it will be appreciated that other camera assemblies are possible.

The computing device 117 may be configured to control the motor 108 and/or camera 114. The computing device 117 may be configured to communicate with one or more management devices 17. For example, the computing device 117 of the camera system 15 may be used to transmit a video feed to the server 21 and/or the management device 17 through the network 24.

In some embodiments, the lens 83 may include a lens portion 141 and a barrel portion 144. The lens portion 141 may be any suitable, transparent and hydrophobic material. For example, the lens portion 141 may be a bonded acrylic lens with an anti-fog coating according to some embodiments. The barrel portion 144 may be any suitable material, such as a metal, metal alloy, plastic, etc. For example, the barrel portion 144 may be an aluminum 6061 zinc plated lens barrel.

The lens 83 may be spun, facilitated by the turning of the gears 111a-b and one or more ball bearings 147a-b, to deflect liquid in a humid and/or wet environment. For example, spinning of the lens 83 may be used to ensure that the lens 83 stays free of moisture and/or droplets that could affect the visibility of the camera 114 through the lens 83. The inventors have discovered that spinning the lens 83 at 900 RPMs or more has yielded suitable results for preventing moisture and or/droplet accumulation, maintaining visibility for the camera 114. In some embodiments, the lens is spun at 900-950 RPMs. In some embodiments, the lens 83 may include a spring-loaded rotary shaft seal 149 to facilitate the weather proofing of the enclosure 47 as discussed above.

Figure 10:
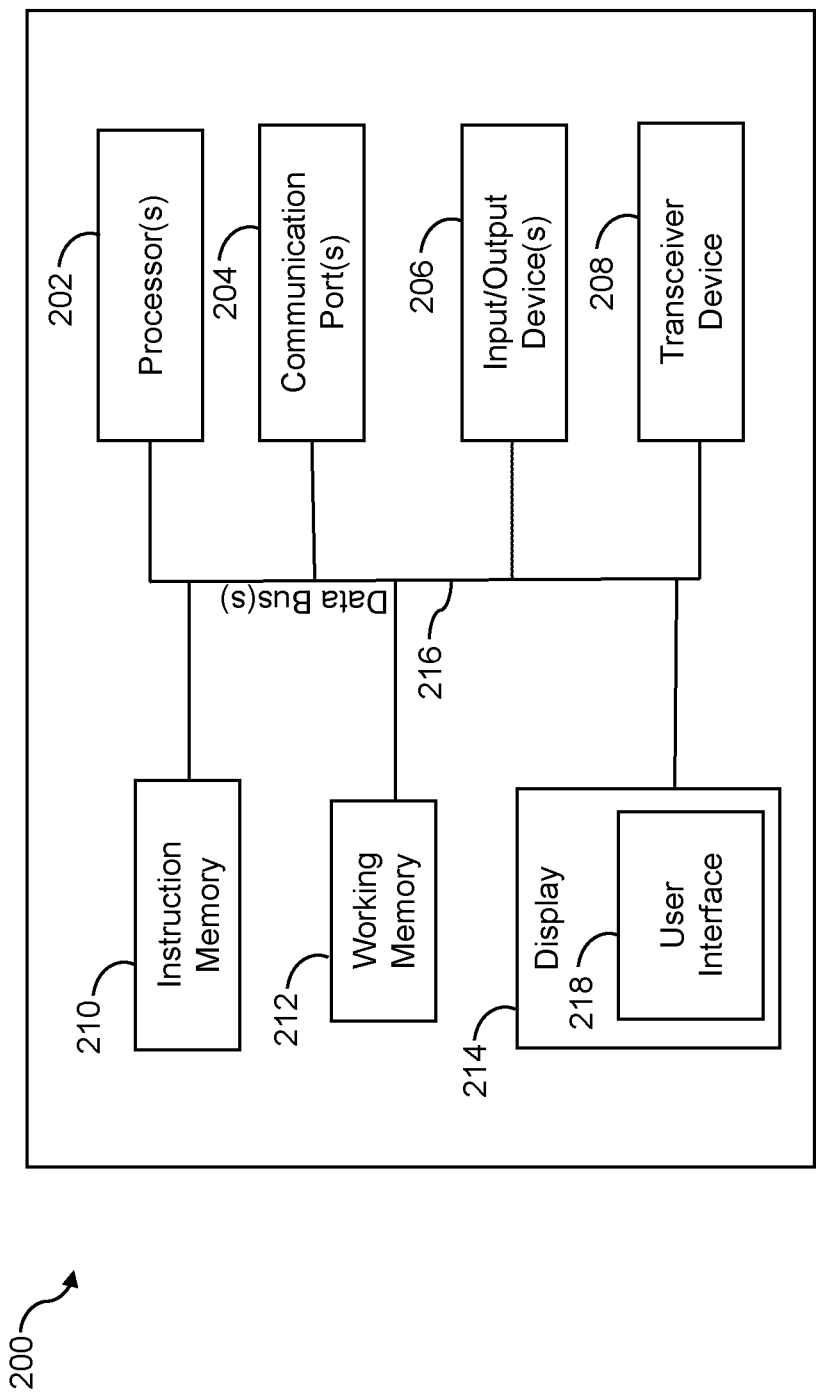
FIG. 10 illustrates a block diagram of one example of a computing device of an anchor monitoring system in accordance with some embodiments.

FIG. 10 illustrates a block diagram of one example of an exemplary computing device 200 of an anchor monitoring system 10 in accordance with some embodiments. The computing device 200 can be employed by a disclosed system or used to execute a disclosed method of the present disclosure. Computing device 200 may be configured to operate the anchor monitoring system 10, be one of the computing devices (e.g., computing device 117, management device 17, server 21, etc.) and/or perform the method illustrated in FIG. 18 and implement the set of instructions illustrated in FIG. 19 as discussed in more detail below. It should be understood, however, that other computing device configurations, including distributed and/or cloud-based systems, are possible.

Computing device 200 can include one or more processors 202, one or more communication port(s) 204, one or more input/output devices 206, a transceiver device 208, instruction memory 210, working memory 212, and a display 214, all operatively coupled to one or more data buses 216. Data buses 216 allow for communication among the various devices, processor(s) 202, instruction memory 210, working memory 212, communication port(s) 204, and/or display 214. Data buses 216 can include wired, or wireless, communication channels. Data buses 216 are connected to one or more devices.

Processor(s) 202 can include one or more distinct processors, each having one or more cores. Each of the distinct processors 202 can have the same or different structures. Processor(s) 202 can include one or more central processing units (CPUs), one or more graphics processing units (GPUs), application specific integrated circuits (ASICs), digital signal processors (DSPs), and the like.

Processor(s) 202 can be configured to perform a certain function or operation by executing code, stored on instruction memory 210. For example, processor(s) 202 can be configured to perform one or more of any function, method, or operation disclosed herein.

Communication port(s) 204 can include, for example, a serial port such as a universal asynchronous receiver/transmitter (UART) connection, a Universal Serial Bus (USB) connection, or any other suitable communication port or connection. In some examples, communication port(s) 204 allows for the programming of executable instructions in instruction memory 210. In some examples, communication port(s) 204 allow for the transfer, such as uploading or downloading, of data. In some embodiments, a wired or wireless fieldbus or Modbus protocol may be used.

Input/output devices 206 can include any suitable device that allows for data input or output. For example, input/output devices 206 can include one or more of a keyboard, a touchpad, a mouse, a stylus, a touchscreen, a physical button, a speaker, a microphone, or any other suitable input or output device.

Transceiver device 208 can allow for communication with a network, such as a Wi-Fi network, an Ethernet network, a cellular network, radio signals, Bluetooth, a long range (LoRa) network, or any other suitable communication network. For example, if operating in a cellular network, transceiver device 208 is configured to allow communications with the cellular network. Processor(s) 202 is operable to receive data from, or send data to, a network via transceiver device 208.

Instruction memory 210 can include an instruction memory 210 that can store instructions that can be accessed (e.g., read) and executed by processor(s) 202. For example, the instruction memory 210 can be a non-transitory, computer-readable storage medium such as a read-only memory (ROM), an electrically erasable programmable read-only memory (EEPROM), flash memory, a removable disk, CD-ROM, any non-volatile memory, or any other suitable memory with instructions stored thereon. For example, the instruction memory 210 can store instructions that, when executed by one or more processors 202, cause one or more processors 202 to perform one or more of the operations of the monitoring system 10.

In addition to instruction memory 210, the computing device 200 can also include a working memory 212. Processor(s) 202 can store data to, and read data from, the working memory 212. For example, processor(s) 202 can store a working set of instructions to the working memory 212, such as instructions loaded from the instruction memory 210. Processor(s) 202 can also use the working memory 212 to store dynamic data created during the operation of computing device 200. The working memory 212 can be a random access memory (RAM) such as a static random access memory (SRAM) or dynamic random access memory (DRAM), or any other suitable memory.

Display 214 can be configured to display user interface 218. User interface 218 can enable user interaction with computing device 200. In some examples, a user can interact with user interface 218 by engaging input/output devices 206. In some examples, display 214 can be a touchscreen, where user interface 218 is displayed on the touchscreen. Other types of user interfaces 218 also may be used, including a voice input (e.g., a microphone and corresponding speech recognition software), a keyboard, trackpad, and/or a mouse, to list only a few other possible examples.

Figure 11:
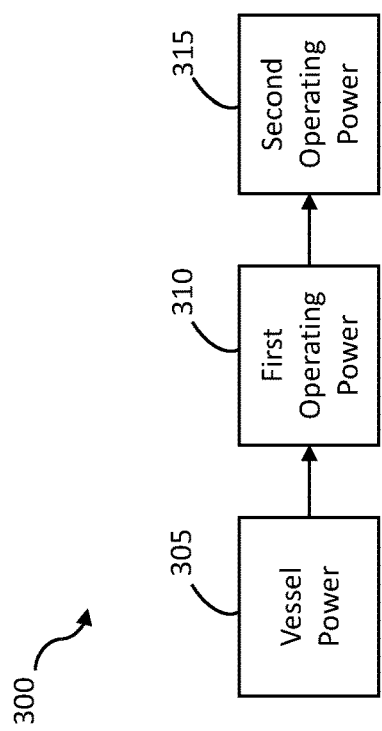
FIG. 11 illustrates a block diagram of one example of power distribution of an anchor monitoring system in accordance with some embodiments.

Referring now to FIG. 11, which shows a block diagram 300 of power distribution for a vessel. The anchor monitoring system 10 may be configured to step down or reduce the voltage from the vessel's main power 305 down to one or more operating voltages, such as first operating power 310 and second operating power 315 of the anchor monitoring system 10. For example, the anchor monitoring system 10 may be connected to vessel power 305, which may be 120 volts or 200 volts for example. The anchor monitoring system 10 may include one or more transformers that reduce the vessel's main power for use by one or more components of the anchor monitoring system 10 (e.g., the motor 108, the camera 114, the computing device 117, etc.). The anchor monitoring system 10 may also include an AC to DC converter to convert the vessel power 305 from AC to DC. In some embodiments, the transformers and AC to DC converter reduce the voltage down to the first operating power 310 of 12 volts DC and/or the second operating power 315 of 5 volts DC.

Figure 12:
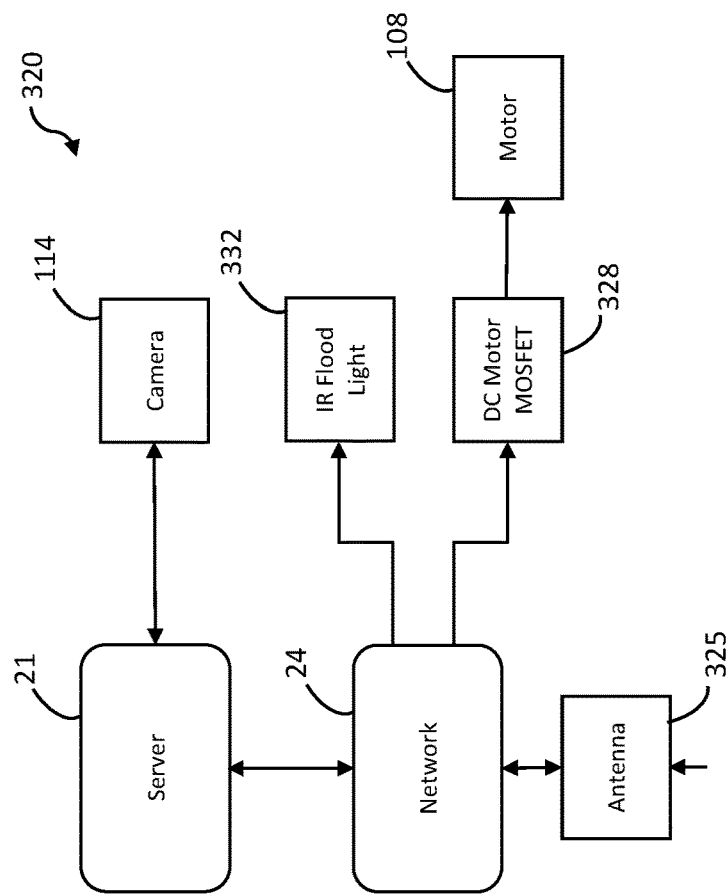
FIG. 12 illustrates a block diagram of a monitoring system in accordance with some embodiments.

FIG. 12 illustrates a block diagram 320 of one example of a camera system 15 of an anchor monitoring system 10 in accordance with some embodiments. For example, the camera system 15 may include an antenna 325 that is used to communicatively couple the camera system 15 to the one or more management devices 17 and/or the server 21 through the network 24. For example, the antenna 325 may receive one or more instructions from the management device 17 to power on the anchor monitoring device 10, which may include turning on the camera 114, powering up the motor 108, which may be controlled by a metal-oxide-semiconductor field-effect transistor (MOSFET) 328, and turning on an infrared flood light 332. In some embodiments, the camera 114 transmits the video feed to the management device 17 and/or the server 21 through the network 24.

Figure 13:
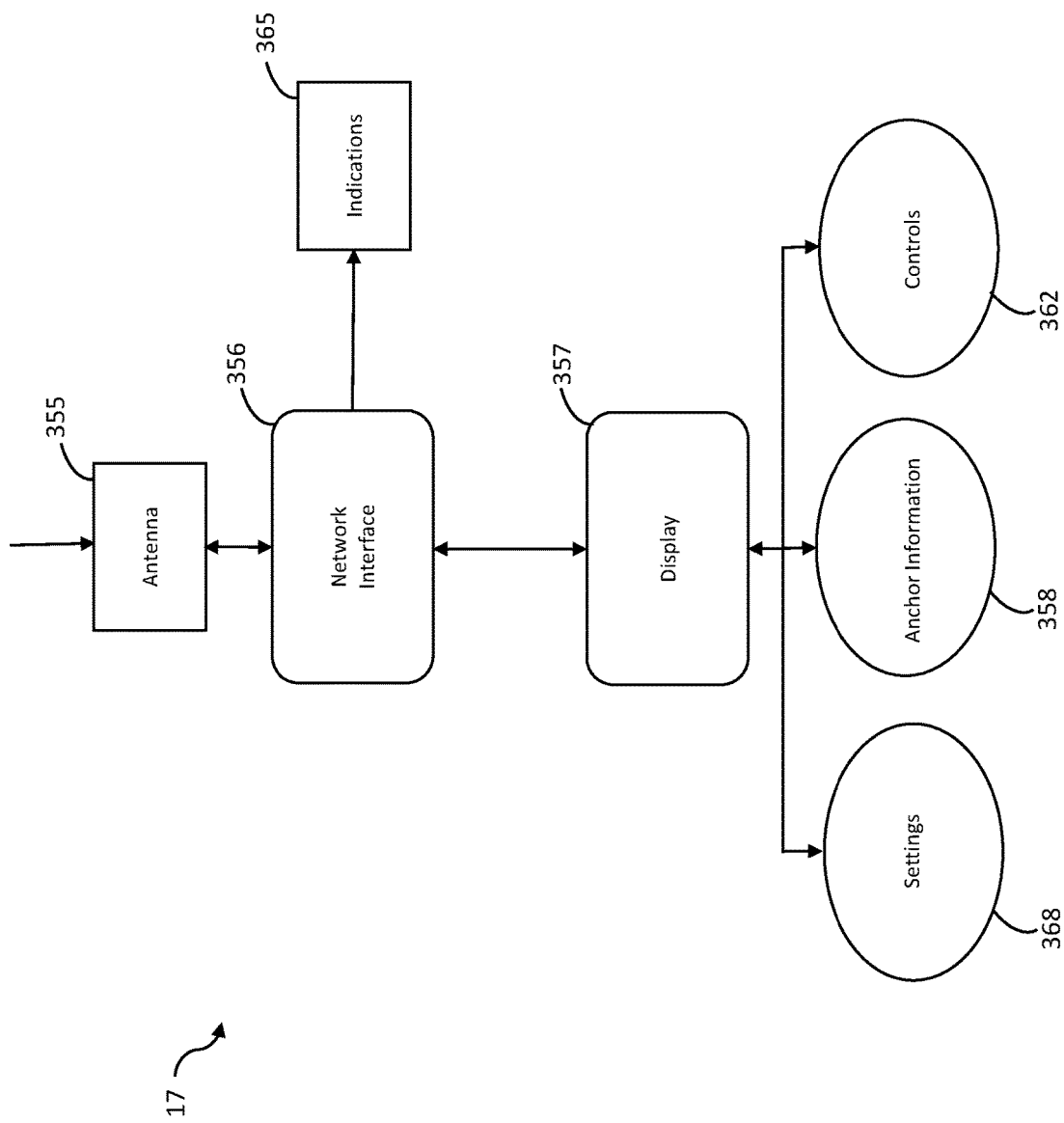
FIG. 13 illustrates a block diagram of a management device of an anchor monitoring system in accordance with some embodiments.

FIG. 13 illustrates a block diagram of a management device 17 of an anchor monitoring system 10 in accordance with some embodiments. The management device 17 may also include an antenna 355, similar to the antenna 325 for the camera system 15. For example, the antenna 355 may receive communication from the camera system 15 and/or the server 21 through the network 24, facilitated by a network interface 356. In some embodiments, the network interface utilizes long range (LoRa) radio communication technology.

In some embodiments, the video feed from the camera 114 is provided on a display 357 of the management device 17. In some embodiments, the video feed from the camera 114 is processed by the management device 17 for further evaluation, such as by server 21. For example, the management device 17 may provide a display 357 with a user interface that is configured to display anchor information 358, such as anchor chain tightness, the direction of the anchor chain relative to the vessel, a three dimensional rendering of the anchor and anchor chain, and other indications of the anchor and/or the anchor monitoring system 10. For example, the anchor monitoring system 10 may be configured to alert a user that the lens 83 of the anchor monitoring system 10 needs to be cleaned.

In some embodiments, the management device 17 may be configured to provide controls 362 on the display 357 such as deploying or retracing the anchor and muting the alarm, just to provide a few examples. The management device 17 may also be configured to set off indications 365 on the display 357, such as sounds, lights, alarms, and/or flares of the vessel based on anchor casualties, such as the anchor is dragging, at a risk of dragging, indications that the anchor has been broken, a collision alarm, etc. For example, the indications 365 may be activated before or after a casualty has occurred. In some embodiments, the indications 365 may be visual or audible alarms on the management device 17. In some embodiments, the indications 365 may be audible or visual alarms coming from the vessel's alarm system or from a separate, standalone alarm system. The user interface of the management device 17 may be configured to process anchor status information based on settings 368 of a vessel's specific anchor, such as the anchor weight and anchor chain size.

Figure 14C:
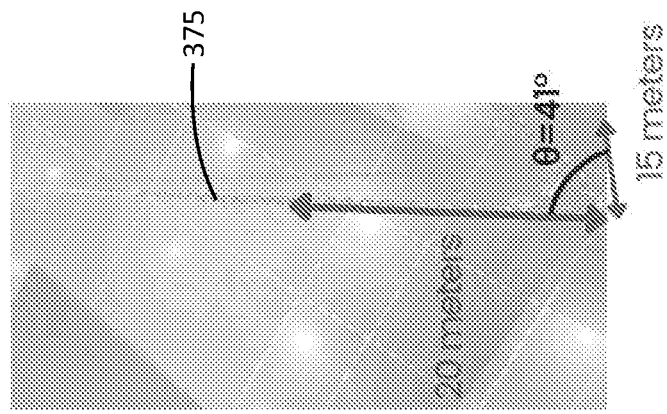
FIG. 14C illustrates an anchor monitoring system determining an angle of an anchor chain in accordance with some embodiments.
Figure 14B:
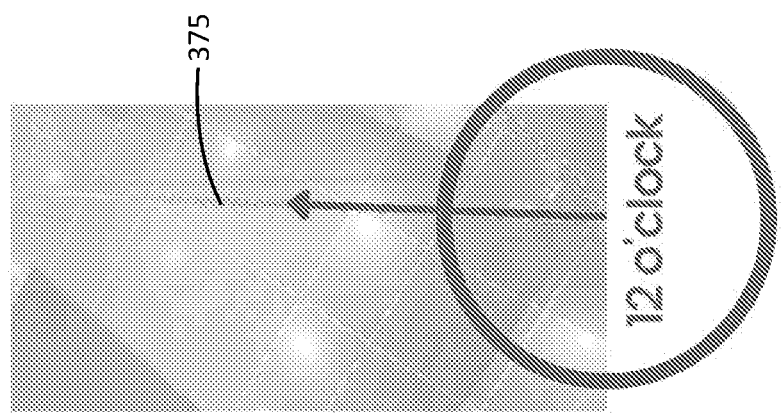
FIG. 14B illustrates an anchor monitoring system determining a direction of an anchor chain in accordance with some embodiments.
Figure 14A:
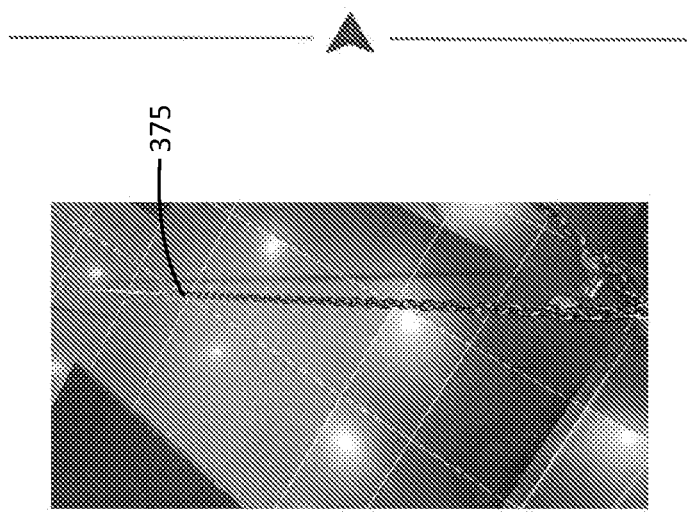
FIG. 14A illustrates an anchor monitoring system monitoring an anchor chain in accordance with some embodiments.

Referring now to FIGS. 14A-14C, the position and orientation of the anchor chain 375 may be processed by an artificial intelligence computer vision model. For example, the video feed from the camera 114 may be transmitted to the management device 17 for processing by a computer vision model as shown in FIG. 14A. In some embodiments, the computer vision model processing may be completed by server 21 or ran on server 21. The computer vision model may be configured to detect each chain link of the anchor chain above the water. The computer vision model may then determine the tension of the anchor chain (or "o'clock positon") as shown in FIG. 14B. The computer vision model may also determine the angle of the anchor chain as shown in FIG. 14C, which can be an indication of tightness of the anchor chain. In some embodiments, the computer vision model may utilize the YOLOv5 model. In some embodiments, the computing device 117, the management device 17, and/or a computing device of server 21 may be an NVIDIA® Jetson™ Nano computer.

Based on the observed characteristics of the anchor (e.g., the distance the anchor chain is from the water, the length of the anchor chain above the water, etc.) and the input settings, such as the anchor weight and chain size, the angle of the anchor chain can be determined. For example, the angle of the anchor chain can be determined using the following equation:

$$\theta = \cos^{-1}\left(\frac{y_{visible}}{L_{visible}}\right) \quad \text{(Equation 1)}$$

Where:
θ=angle of the anchor chain with respect to a vertical axis of the vessel;

$y_{visible}$ = distance between the anchor chain exiting the ship to the sea level;

and $L_{visible}$ = Function of the anchor chain visible above the water.

The function of the anchor chain visible above the water ($L_{visible}$) can be determined using the following equation:

$$L_{visible} = n(l_{cl} - t_{cl}) \quad \text{(Equation 2)}$$

Where:
n=number of anchor chain links identified above the water;

$l_{cl}$ = length of the anchor chain link;

$t_{cl}$ = thickness of an anchor chain link.

Equations 1 and 2 above can be used to determine a risk of the anchor dragging based on the angle of the anchor chain with respect to the vessel. Effectively, the sea level, the distance between the anchor chain exiting the ship to the sea level ($y_{visible}$), and the function of the anchor chain visible above the water ($L_{visible}$) make a right triangle, allowing the angle (θ) between $L_{visible}$ and $y_{visible}$ to be determined. The length of an anchor chain link ($l_{cl}$) and the thickness of an anchor chain link ($t_{cl}$) are constants based on the type of anchor chain and can be a settings input. The number of chain links (n) that are visible is determined with the camera vision model that receives the video feed from the camera system 15 by performing object detection and drawing a bounding box around each visible chain link.

As an example, if the angle of the anchor chain (θ) is 0-15 degrees, the drag risk may be characterized as "low." When θ is 15-45 degrees, the drag risk may also be characterized as "low." When θ is 45-65 degrees, the drag risk may be characterized as "medium." When θ is 65 degrees or more, the drag risk may be characterized as "high." It will be appreciated that other ranges may be used to characterize the drag risk, and the anchor monitoring system 10 may allow for changing the ranges as desired.

Figure 15A:
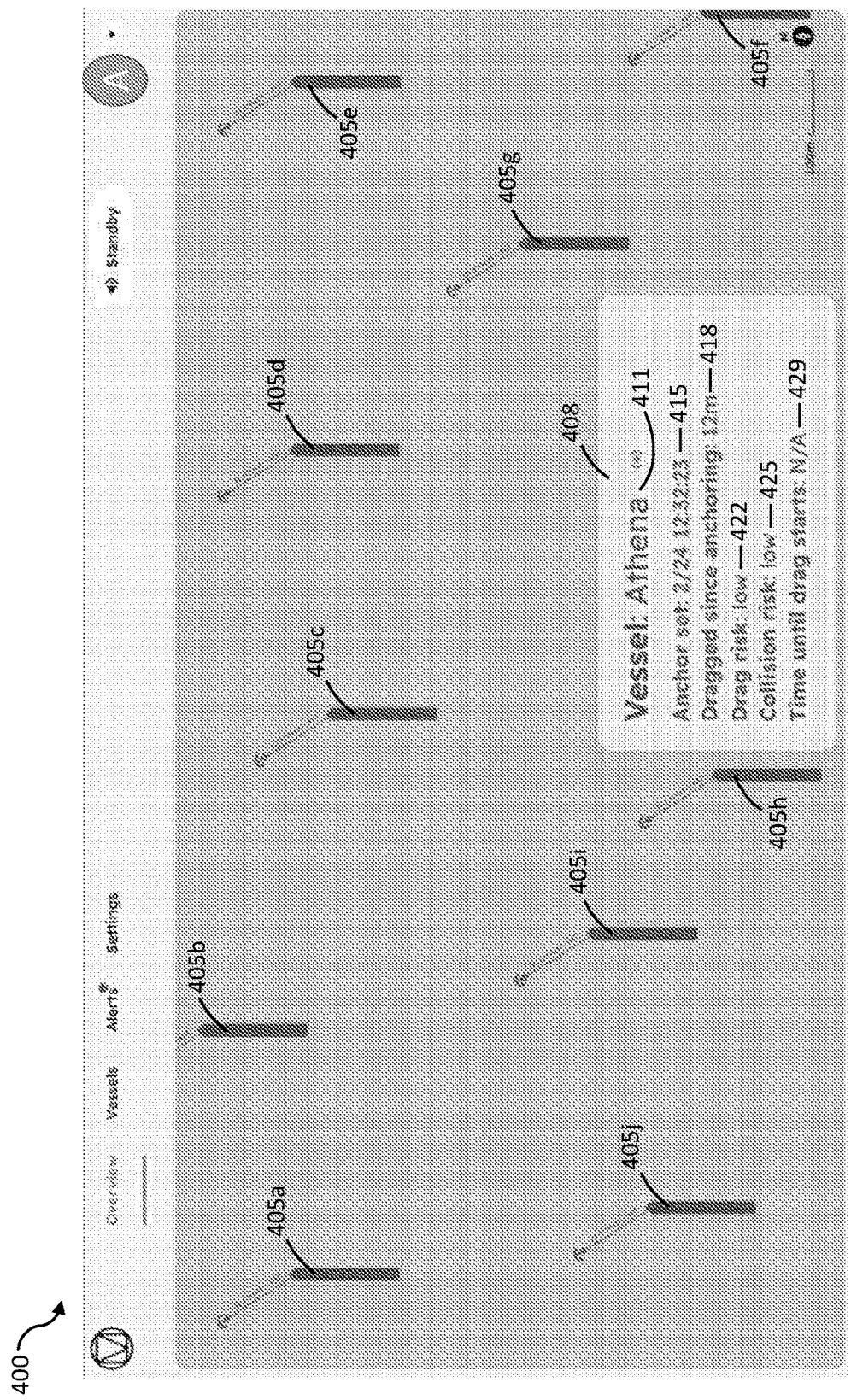
FIG. 15A illustrates a first example of a user interface of a management device in accordance with some embodiments.
Figure 15B:
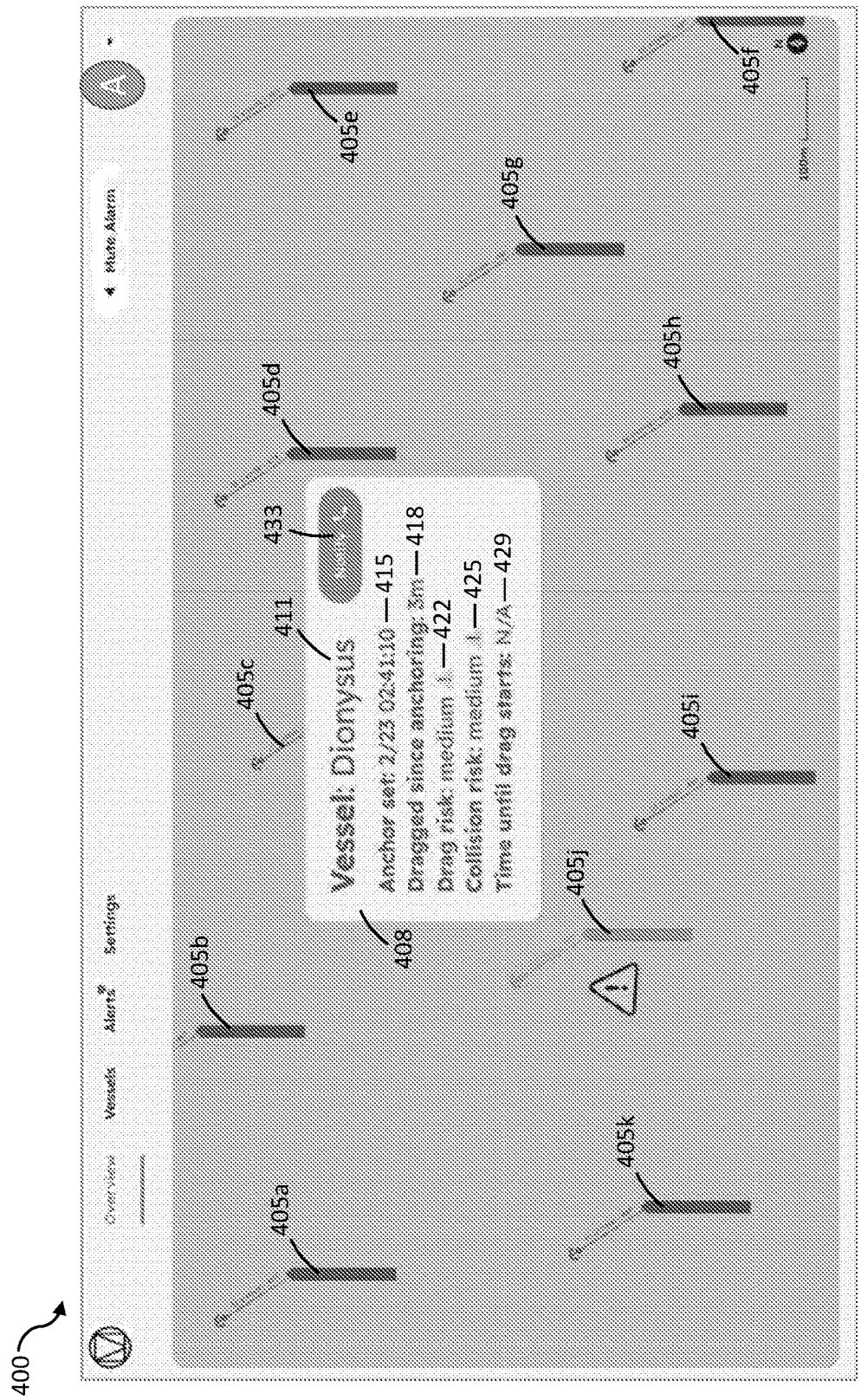
FIG. 15B illustrates a second example of a user interface of a management device in accordance with some embodiments.
Figure 15C:
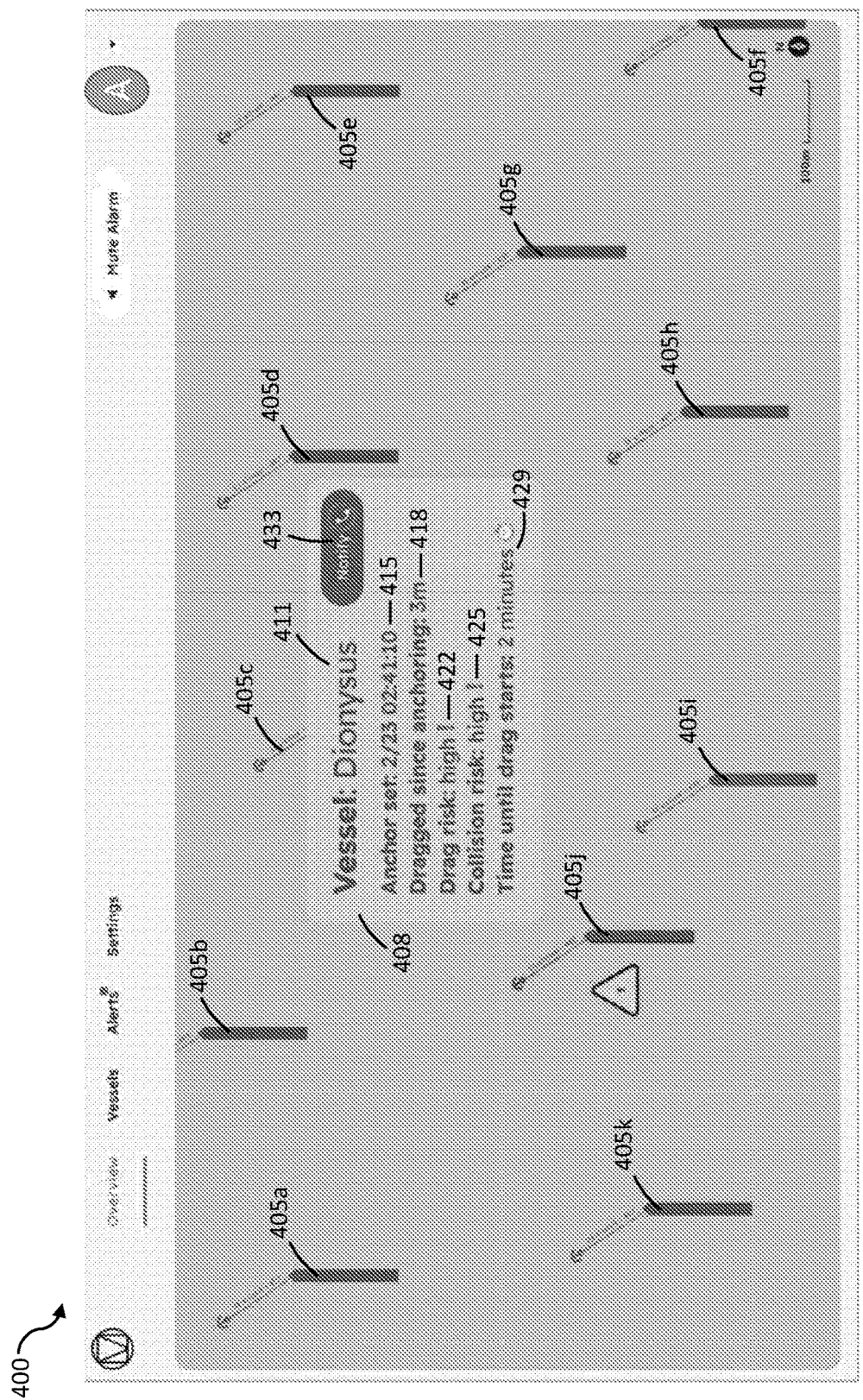
FIG. 15C illustrates a third example of a user interface of a management device in accordance with some embodiments.

Referring now to FIGS. 15A-C, the management device 17 may provide a user interface 400 that may illustrate one or more vessels 405a-k. The user interface 400 may be configured to provide vessel information 408 for each vessel 405a-k, which may occur when selecting a specific vessel 405a-k from the user interface 400. The vessel information 408 may include: (1) the vessel name 411; (2) the day and time the anchor was set 415; (3) the distance the anchor has dragged since last anchoring 418; (4) the drag risk score 422; (5) the collision risk score 425; and (6) the time until drag starts 429. In some embodiments, the management device 17 may include information for all of the vessels 405a-k in vicinity so that the collision risk can be evaluated in light of the drag risk score associated with other vessels 405a-k.

The drag risk score 422 may depend on the tension of the anchor chain proxied by the calculated angle θ, so as to determine if the anchor is at risk of dragging on the bottom of the ocean floor. For example, the drag risk score 422 may depend on the anchor chain angle θ, as evaluated by the computer vision model. When the anchor chain is substantially straight up and down with reference to the location the anchor chain is fed out of the vessel (e.g., the hawse pipe of a vessel), or at an angle between 0-15 degrees from the vessel, the anchor chain tension is very loose and the anchor chain may not be touching the ocean floor at all. If the anchor is not being actively being retracted or deployed during this time, the anchor chain angle between 0-15 degrees is a low risk of the vessel dragging the anchor. When the anchor chain is between 15-45 degrees from the vessel, the anchor tension is slack, which can be an indication that the anchor is at low risk of dragging on the ocean floor. When the anchor chain is between 45-65 degrees from the vessel the anchor chain tension is moderately tight, which is an indication that the vessel is at a medium risk of the anchor dragging. When the anchor chain is above 65 degrees, the anchor chain tension is very tight, which can be an indication that the vessel is at a very high risk of the anchor dragging.

The collision risk score 425 can be determined by determining that if the anchor was currently dragging, how likely is the vessel to colliding with another ship. For example, the management device 17 may include the position from other vessels, such as from other monitoring devices 13 or from automatic identification system (AIS) data. A collision risk score 425 may be characterized as "low" if the closest ship is outside of a 1 mile radius. A collision risk score may be characterized as "medium" if the closest ship is between 0.5-1 mile radius around the vessel. A collision risk score may be characterized as "high" if the closest ship is inside of a 0.5 mile radius around the vessel. One of ordinary skill in the art will understand that the distances/ranges provided merely are exemplary and other distances/ranges may be used in determining a collision risk score and can be adjusted in settings.

As an example, when the computer vision model has determined that the anchor drag risk score 422 is "low" and the collision risk score 425 is "low" for a specific vessel 405*h*, the vessel information 408 may reflect this visually with the scores of "low" and/or a neutral color (e.g., green) for the vessel information 408 or the vessel 405*h* itself as illustrated in FIG. 15A.

When the computer vision model has determined that the anchor drag risk score 422 is "medium" and the collision risk score 425 is "medium" for a specific vessel 405*j*, the vessel information 408 may reflect this visually with the scores of "medium", a caution color (e.g., yellow and/or orange), and a caution symbol on the vessel information 408 or next to the vessel 405*j* as illustrated in FIG. 15B. In some embodiments, the user interface 400 will provide a notification function 433 to notify the vessel 405*j* directly, such as through a phone call, a chat message, a notification pop up on a similar user interface on that specific vessel 405*j*, or a combination thereof, just to provide a few examples.

When the computer vision model has determined that the anchor drag risk score 422 is "high" and the collision risk score 425 is "high" for a specific vessel 405*j*, the vessel information 408 may reflect this visually with the scores of "high", a warning color (e.g., red), and a caution symbol on the vessel information 408 or next to the vessel 405*j* as illustrated in FIG. 15C. In some embodiments, the user interface 400 will provide the notification function 433 to notify the vessel 405*j* directly, such as through a phone call, a chat message, a notification pop up on a similar user interface on that specific vessel 405*j*, or a combination thereof just to provide a few examples.

The time until drag start 429 may be determined using past data of the angle of the anchor chain (θ) and forecasting when the angle (θ) will exceed a predetermined value based on the past data. For example, the time until drag 429 reflects the time in the future that the anchor is expected to start dragging based on a predetermined angle of 65 degrees or more. It will be appreciated that this predetermined angle corresponding to the time until drag 429 can be changed through the management device 17.

Figure 16:
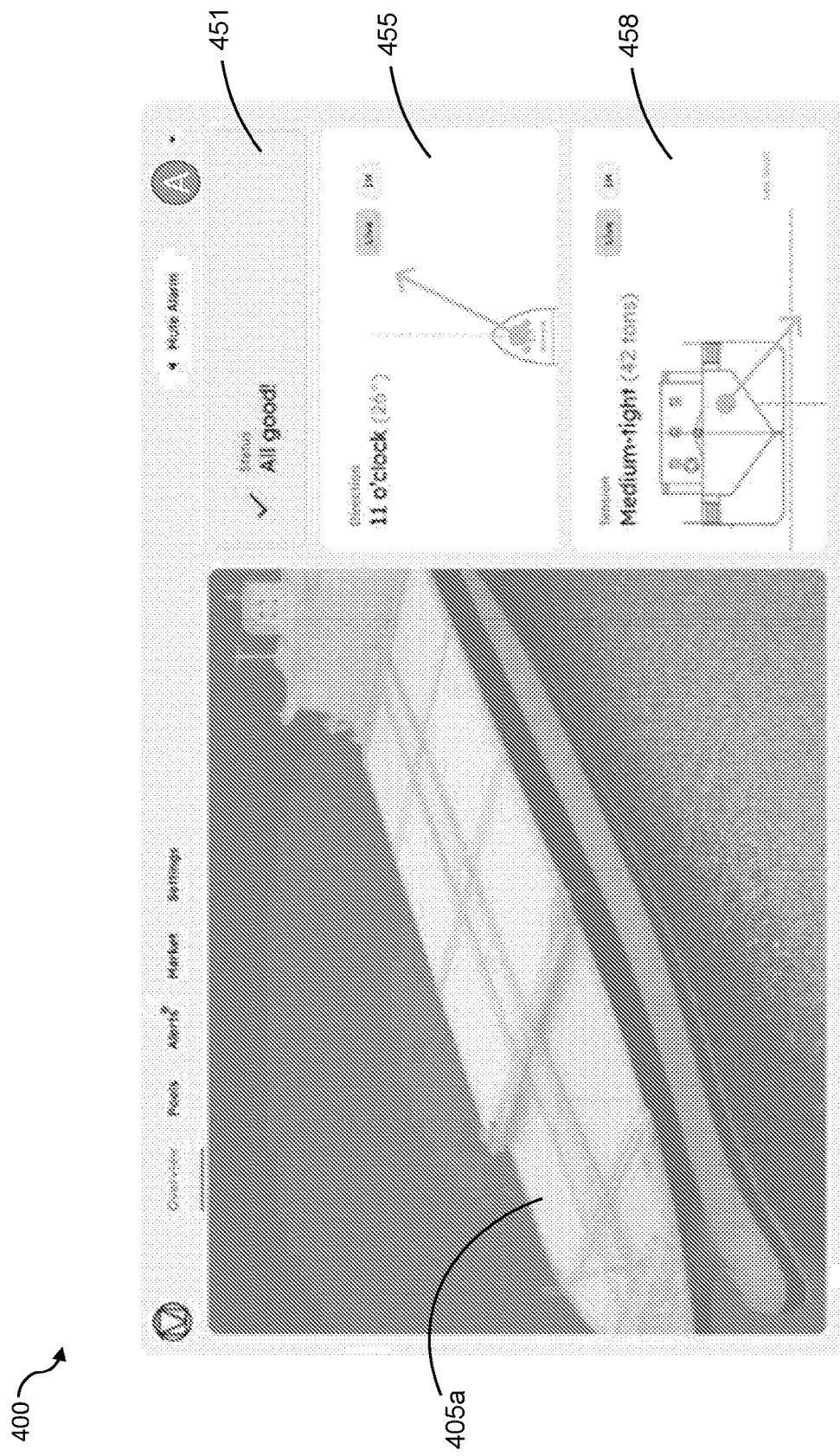
FIG. 16 illustrates a fourth example of a user interface of a management device in accordance with some embodiments.

Referring now to FIG. 16, a user of the management device 17 may be able to select a specific vessel 405*a* from the user interface 400. In some embodiments, the specific vessel screen may illustrate an overall status 451 of the vessel, a visual and/or numerical representation of the direction of the anchor chain relative to the vessel 455, and an anchor chain tension status 458 of the vessel 405*a*. In some embodiments, the overall status 451 may be a combination of the drag risk score 422 and the collision risk score 425. In some embodiments, the tension status 458 may be based on the anchor chain angle, or "o'clock" position as discussed above. In some embodiments, the user interface 400 may provide a projection of status out a predetermined time. For example, the computer vision model may be configured to determine what the direction of the anchor chain will be in 1 minute, 5 minutes, 10 minutes, etc. based on the computer vision model and associated algorithms, and be available for display on user interface 400. The computer vision model may also be configured to determine what the anchor chain tension status of the anchor chain will be in 1 minute, 5 minutes, 10 minutes, etc. based on the computer vision model and associated algorithms, and be available for display on user interface 400.

Figure 17C:
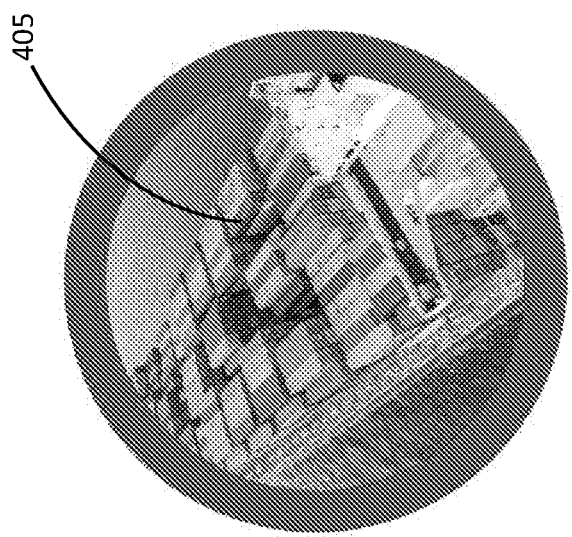
FIG. 17C illustrates an example of an anchor monitoring system in a fourth mode in accordance with some embodiments.
Figure 17B:
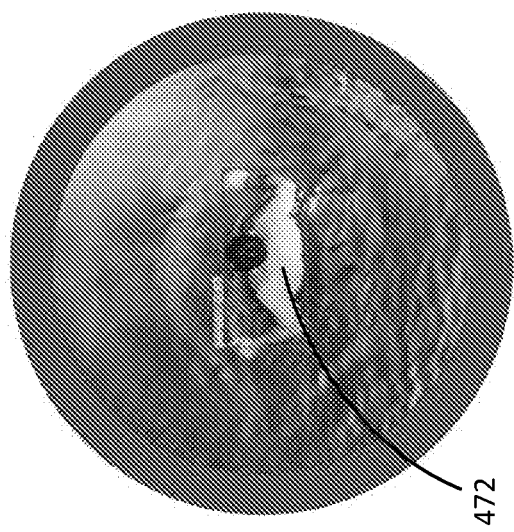
FIG. 17B illustrates an example of an anchor monitoring system in a third mode in accordance with some embodiments.
Figure 17A:
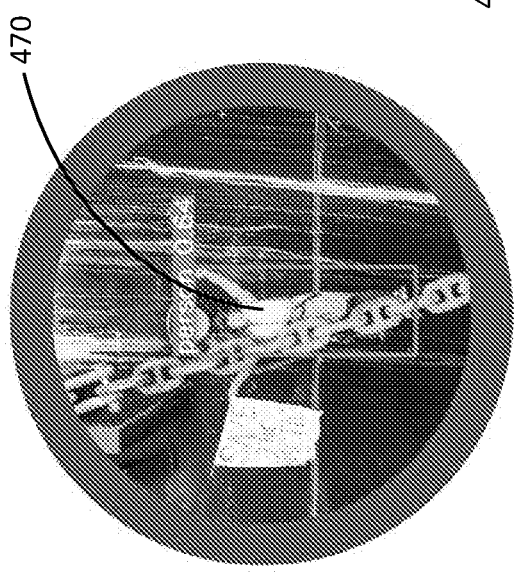
FIG. 17A illustrates an example of an anchor monitoring system in a second mode in accordance with some embodiments.

Referring now to FIGS. 17A-17C, the anchor monitoring system 10 may be configured to provide additional modes of operation in addition to monitoring the anchor of a vessel. In an example, the anchor monitoring system 10 may be configured to identify one or more people 470 attempting to gain access to the vessel as illustrated in FIG. 17A. In this second mode, the computer vision model detects one or more people 470 in the picture on or near the anchor chain and labels them as a "pirate." This second mode of operation, or "pirate" mode, can alert a user of the management device 17 through visual or audible alerts either through management device 17 and/or other locations throughout the vessel.

The anchor monitoring system 10 may also be configured to identify one or more people 472 that have fallen overboard. In this third mode of operation, the computer vision model detects one or more people 472 not near the anchor chain (e.g., a predetermined distance, which may be a threshold distance, away from the anchor chain) and labels them as "overboard." This third mode of operation, or "overboard" mode, can alert a user of the management device 17 through visual or audible alerts, either through the management device 17 and/or other locations throughout the vessel. In some embodiments, the anchor monitoring system 10 will track the person 472 that has fallen overboard and provide relevant indications on the display of the management device 17, such as water temperature, time the person fell overboard, and distance from the person overboard, just to provide a few examples.

The anchor monitoring system 10 may also be configured to provide a full, 360-degree view of the vessel 405. This fourth mode of operation, or "perimeter" mode, may provide a user of management device 17 a full, 360-degree view around the vessel 405. For example, multiple monitoring systems 13 may be placed in various locations around the vessel 405 to provide a full, 360-degree view of the vessel 405. In some embodiments, this fourth mode of operation may work in tandem with the "pirate" mode and/or "overboard" mode to maintain visibility on the persons 470 attempting to gain unauthorized access or those have fallen overboard 472, respectively.

Figure 18:
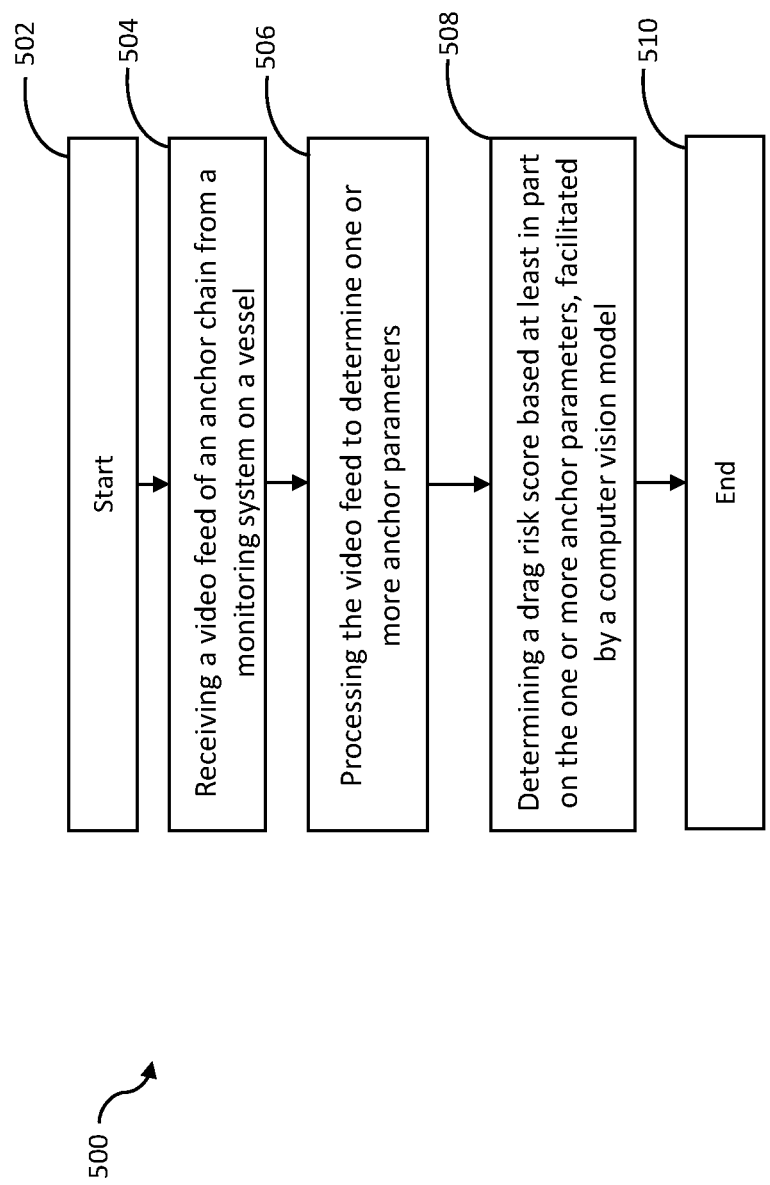
FIG. 18 illustrates a flow diagram of one example of a method of monitoring maritime operations in accordance with some embodiments.

FIG. 18 illustrates a flow diagram of one example of a method 500 of monitoring maritime operations in accordance with some embodiments. In some embodiments, method 500 may start at step 502. In some embodiments, the method 500 may also include step 504, which may comprise receiving a video feed of an anchor chain 375 from a monitoring system 13 on a vessel 405. In some embodiments, the method 500 may also include step 506, which may comprise processing the video feed to determine one or more anchor parameters. In some embodiments, the method 500 may also include step 508, which may comprise determining a drag risk score 422 based at least in part on the one or more anchor parameters, facilitated by a computer vision model. The method 500 may end at step 510.

Figure 19:
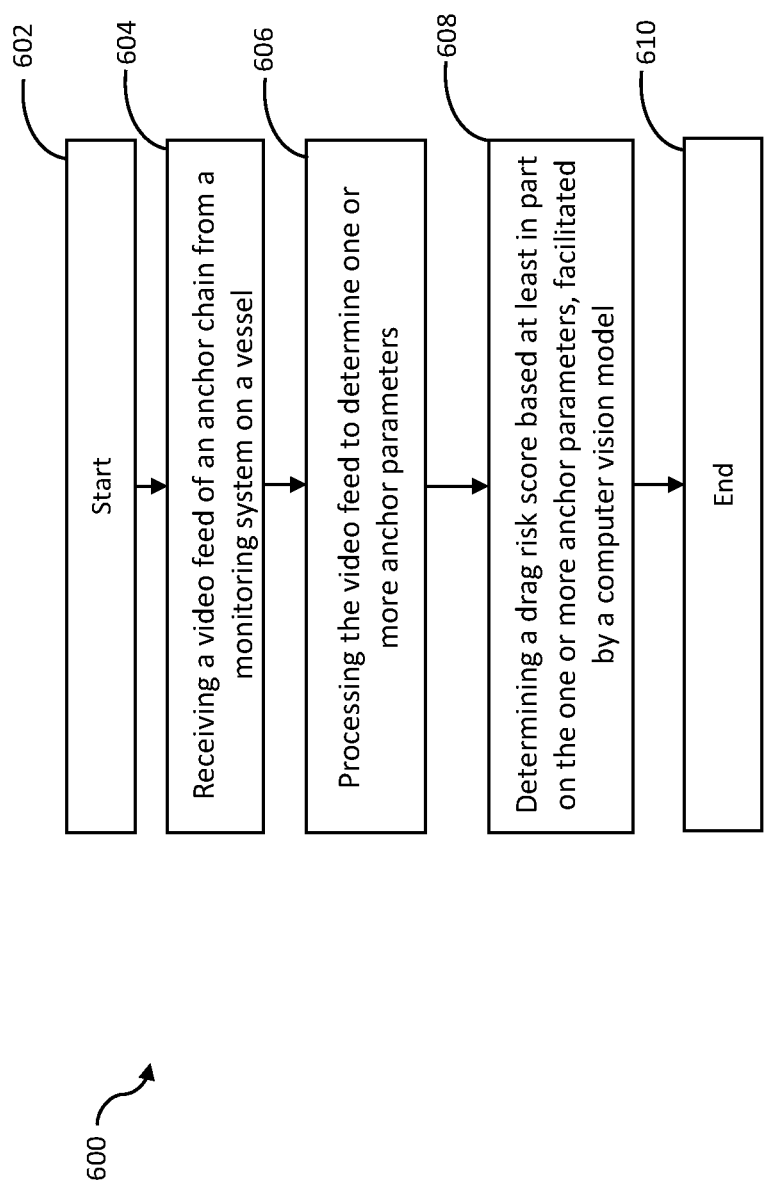
FIG. 19 illustrates a flow diagram of one example of an implementation of a set of instructions to monitor maritime operations in accordance with some embodiments.

FIG. 19 illustrates a flow diagram of one example of implementation of a set of instructions 600 to monitor maritime operations in accordance with some embodiments. In some embodiments, instructions may start at step 602. In some embodiments, the instructions 600 may also include step 604, which may comprise receiving a video feed of an anchor chain 375 from a monitoring system 13 on a vessel 405. In some embodiments, the instructions 600 may also include step 606, which may comprise processing the video feed to determine one or more anchor parameters. In some embodiments, the instructions 600 may also include step 608, which may comprise determining a drag risk score 422 based at least in part on the one or more anchor parameters, facilitated by a computer vision model. The instructions 600 may end at step 610.

FEATURES OF THE DISCLOSURE

In some embodiments, a monitoring system may include an enclosure defining a void. The enclosure may be configured to be mounted to a floating vessel. The monitoring system may also include a camera system disposed within the void and coupled to the enclosure. The camera system may include a motor having a shaft, a lens, a first gear operatively coupled to the shaft, a second gear operatively coupled to the lens, wherein the first gear and the second gear are engaged, and at least one camera having a second computing device and disposed behind the lens. The lens may be configured to spin at 900 revolutions per minute (RPM) or more, facilitated by the motor, the first gear, and the second gear, to remove moisture from the lens. The camera system may be configured to transmit a video feed of an anchor chain to at least a first computing device. The first computing device may be configured to analyze the video feed to determine a drag risk score with a computer vision model based at least in part on an angle of the anchor chain. The first computing device may be configured to determine a collision risk score.

In some embodiments, the enclosure may include a front member defining the void, a back member, and a case. The front member and the back member may be each operatively coupled to opposite sides of the case with at least one fastener.

In some embodiments, the second computing device may be configured to transmit a video feed from the at least one camera to the at least one first computing device.

In some embodiments, the lens may include a lens portion and a barrel portion. The lens portion may be transparent and have an anti-fog coating.

In some embodiments, the motor may be coupled to a bottom side of the enclosure and the camera may be coupled to a top side of the enclosure.

In some embodiments, the enclosure may be waterproof and dustproof.

In some embodiments, an anchor monitoring system may include a monitoring system having a camera system configured to monitor an anchor of a vessel. The anchor monitoring system may also include a management device communicatively coupled to the monitoring system. The anchor monitoring system may also include a server communicatively coupled to the monitoring system and the camera system. The server may be configured to determine a drag risk score of an anchor based on a computer vision model.

In some embodiments, the monitoring system may include an enclosure that defines a void. The camera system may be disposed within the void. The enclosure may be waterproof and dustproof.

In some embodiments, the camera system may include a motor having a shaft, a lens, a first gear operatively coupled to the shaft, a second gear operatively coupled to the lens, wherein the first gear and the second gear are engaged, and at least one camera having a computing device and disposed behind the lens. The computing device may be communicatively coupled to the management device and the server. The lens may include a lens portion and a barrel portion. The lens portion may be transparent and may have an anti-fog coating.

In some embodiments, the management device may be configured to display the drag risk score. The server may determine a collision risk score. The management device may be configured to display the collision risk score.

In some embodiments, the server may be configured to activate an alarm based at least in part on the drag risk score or the collision risk score.

In some embodiments, the camera system, the management device, and the server may be communicatively coupled through a long range (LoRa) radio communication interface.

In some embodiments, a method may include receiving a video feed of an anchor chain from a monitoring system on a vessel. The method may also include processing the video feed to determine one or more anchor parameters. The method may also include determining a drag risk score based at least in part on the one or more anchor parameters, facilitated by a computer vision model.

In some embodiments, the method may include activating an alarm based at least in part on the drag risk score.

In some embodiments, the method may include determining a collision risk score based at least in part on the drag risk score.

In some embodiments, the method may include activating an alarm based at least in part on the drag risk score and the collision risk score.

In some embodiments, the method may include displaying the drag risk score on a first computing device.

In some embodiments, the one or more anchor parameters may include an anchor chain angle.

In some embodiments, the determination of the drag risk score may be based at least in part on a geo-location of the vessel.

In some embodiments, the camera system and the management device may be communicatively coupled through a long range (LoRa) radio communication interface.

In some embodiments, a non-transitory, computer-readable storage medium storing one or more sequences of instructions which when executed may cause one or more processors to perform receiving a video feed of an anchor chain from a monitoring system on a vessel. The instructions may cause one or more processors to perform processing the video feed to determine one or more anchor parameters. The instructions may cause one or more processors to perform determining a drag risk score based at least in part on the one or more anchor parameters, facilitated by a computer vision model.

In some embodiments, the instructions may cause one or more processors to perform activating an alarm based at least in part on the drag risk score.

In some embodiments, the instructions may cause one or more processors to perform determining a collision risk score based at least in part on the drag risk score.

In some embodiments, the instructions may cause one or more processors to perform activating an alarm based at least in part on the drag risk score and the collision risk score.

In some embodiments, the instructions may cause one or more processors to perform displaying the drag risk score on a first computing device.

In addition, the methods and system described herein can be at least partially embodied in the form of computer-implemented processes and apparatus for practicing those processes. The disclosed methods may also be at least partially embodied in the form of tangible, non-transitory machine-readable storage media encoded with computer program code. For example, the steps of the methods can be embodied in hardware, in executable instructions executed by a processor (e.g., software), or a combination of the two. The media may include, for example, RAMs, ROMs, CD-ROMs, DVD-ROMs, BD-ROMs, hard disk drives, flash memories, or any other non-transitory machine-readable storage medium. When the computer program code is loaded into and executed by a computer, the computer becomes an apparatus for practicing the method. The methods may also be at least partially embodied in the form of a computer into which computer program code is loaded or executed, such that, the computer becomes a special purpose computer for practicing the methods. When implemented on a general-purpose processor, the computer program code segments configure the processor to create specific logic circuits. The methods may alternatively be at least partially embodied in application specific integrated circuits for performing the methods.

In this application, including the definitions below, the term "module" or the term "controller" may be replaced with the term "circuit." The term "module" may refer to, be part of, or include processor hardware (shared, dedicated, or group) that executes code and memory hardware (shared, dedicated, or group) that stores code executed by the processor hardware.

The module may include one or more interface circuits. In some examples, the interface circuit(s) may implement wired or wireless interfaces that connect to a local area network (LAN), a wireless personal area network (WPAN), and a wide area network (WAN). Examples of a LAN are Institute of Electrical and Electronics Engineers (IEEE) Standard 802.11-2016 (also known as the WIFI wireless networking standard) and IEEE Standard 802.3-2015 (also known as the ETHERNET wired networking standard). Examples of a WPAN are the BLUETOOTH wireless networking standard from the Bluetooth Special Interest Group and IEEE Standard 802.15. Examples of a WAN are IEEE standard P1451.5.5 (also known as Standard for a Smart Transducer Interface for Sensors and Actuator—Wireless Communication Protocols and Transducer Electronic Data Sheet (TEDS) Formats—LoRa Protocol), and related technology.

The module may communicate with other modules using the interface circuit(s). Although the module may be depicted in the present disclosure as logically communicating directly with other modules, in various implementations the module may actually communicate via a communications system. The communications system includes physical and/or virtual networking equipment such as hubs, switches, routers, and gateways. In some implementations, the communications system connects to or traverses a wide area network (WAN) such as the Internet. For example, the communications system may include multiple LANs connected to each other over the Internet or point-to-point leased lines using technologies including Multiprotocol Label Switching (MPLS) and virtual private networks (VPNs).

In various implementations, the functionality of the module may be distributed among multiple modules that are connected via the communications system. For example, multiple modules may implement the same functionality distributed by a load balancing system. In a further example, the functionality of the module may be split between a server (also known as remote, or cloud) module and a client (or user) module.

The term machine learning model, as used herein, includes data models created using machine learning. Machine learning, according to the present disclosure, may involve putting a model through supervised or unsupervised training. Machine learning can include models that may be trained to learn relationships between various groups of data. Machine learning models may be based on a set of algorithms that are designed to model abstractions in data by using a number of processing layers. The processing layers may be made up of non-linear transformations. The models may include, for example, artificial intelligence, neural networks, deep convolutional and recurrent neural networks. Such neural networks may be made of up of levels of trainable filters, transformations, projections, hashing, pooling and regularization. The models may be used in large-scale relationship-recognition tasks. The models can be created by using various open-source and proprietary machine learning tools known to those of ordinary skill in the art.

It may be emphasized that the above-described embodiments, particularly any "preferred" embodiments, are merely possible examples of implementations, set forth for a clear understanding of the principles of the disclosure. Many variations and modifications may be made to the above-described embodiments of the disclosure without departing substantially from the spirit and principles of the disclosure. All such modifications and variations are intended to be included herein within the scope of this disclosure.

While this specification contains many specifics, these should not be construed as limitations on the scope of any disclosures, but rather as descriptions of features that may be specific to a particular embodiment. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments.

Although the invention has been described in terms of exemplary embodiments, it is not limited thereto. Rather, the appended claims should be construed broadly, to include other variants and embodiments of the invention, which may be made by those skilled in the art without departing from the scope and range of equivalents of the invention.

What is claimed is:

1. A monitoring system comprising:
   an enclosure defining a void, the enclosure configured to be mounted to a floating vessel;
   a camera system disposed within the void and coupled to the enclosure, the camera system comprising:
   a direct current (DC) motor having a shaft;
   a hydrophobic lens;
   a first gear operatively coupled to the shaft;
   a second gear operatively coupled to the lens, wherein the first gear and the second gear are engaged and are each made of high-density polyethylene plastic; and
   a camera having a second computing device and disposed behind the hydrophobic lens,
   wherein the hydrophobic lens is configured to spin at 900-950 revolutions per minute (RPM), facilitated by the DC motor, the first gear, and the second gear, to remove moisture from the lens,
   wherein the camera system is configured to transmit a video feed of an anchor chain to at least a first computing device,
   wherein the first computing device is configured to analyze the video feed to determine a drag risk score with a computer vision model based at least in part on an angle of the anchor chain,
   wherein the first computing device is configured to determine a collision risk score, and
   wherein the camera system and the first computing device are communicatively coupled through a long range (LoRa) radio communication interface.

2. The monitoring system of claim 1, wherein the enclosure comprises:
   a front member defining the void;
   a back member; and
   a case,
   wherein the front member and the back member are each operatively coupled to opposite sides of the case with at least one zirconium nickel (ZrNi) screw.

3. The monitoring system of claim 2, wherein the second computing device is configured to transmit a video feed from the camera to the at least one first computing device.

4. The monitoring system of claim 3, wherein the hydrophobic lens comprises a lens portion and a barrel portion, the lens portion being transparent and having an anti-fog coating.

5. The monitoring system of claim 4, wherein the DC motor is coupled to a bottom side of the enclosure and the camera is coupled to a top side of the enclosure.

6. The monitoring system of claim 5, wherein the enclosure is waterproof and dustproof.

7. A monitoring system comprising:
   an enclosure defining a void, the enclosure configured to be mounted to a floating vessel;
   a camera system disposed within the void and coupled to the enclosure, the camera system comprising:
   a motor having a shaft, wherein the motor is a 12 volts direct current (DC) motor that turns at 8,574 revolutions per minute (RPM) with a torque of 2.62 inch-ounce;
   a hydrophobic lens, wherein the hydrophobic lens is transparent and has an anti-fog coating;
   a first gear operatively coupled to the shaft;
   a second gear operatively coupled to the lens, wherein the first gear and the second gear are engaged and are each made of high-density polyethylene plastic; and
   a camera having a second computing device and disposed behind the hydrophobic lens,
   wherein the hydrophobic lens is configured to spin at 900-950 revolutions per minute (RPM), facilitated by the motor, the first gear, and the second gear, to remove moisture from the lens,
   wherein the camera system is configured to transmit a video feed of an anchor chain to at least a first computing device,
   wherein the first computing device is configured to analyze the video feed to determine a drag risk score with a computer vision model based at least in part on an angle of the anchor chain, and
   wherein the first computing device is configured to determine a collision risk score.

8. The monitoring system of claim 7, wherein the enclosure is waterproof and dustproof.

9. The monitoring system of claim 8, wherein the hydrophobic lens comprises a lens portion and a barrel portion.

10. The monitoring system of claim 9, wherein the first computing device is configured to display the drag risk score and the collision risk score.

11. The monitoring system of claim 10, wherein the first computing device is configured to activate an alarm based at least in part on the drag risk score or the collision risk score.

12. The monitoring system of claim 11, wherein the camera system and the first computing device are communicatively coupled through a long range (LoRa) radio communication interface.

13. A method of maritime operations for monitoring an anchor chain comprising:
   receiving a video feed of an anchor chain from a monitoring system coupled to a floating vessel, wherein the monitoring system comprises:
   an enclosure defining a void, the enclosure configured to be mounted to a floating vessel;
   a camera system disposed within the void and coupled to the enclosure, the camera system comprising:
   a direct current (DC) motor having a shaft;
   a hydrophobic lens;
   a first gear operatively coupled to the shaft;
   a second gear operatively coupled to the lens, wherein the first gear and the second gear are engaged and are each made of high-density polyethylene plastic; and
   a camera having a second computing device and disposed behind the hydrophobic lens,
   wherein the hydrophobic lens is configured to spin at 900-950 revolutions per minute (RPM), facilitated by the DC motor, the first gear, and the second gear, to remove moisture from the hydrophobic lens;

processing the video feed to determine one or more anchor parameters; and determining a drag risk score based at least in part on the one or more anchor parameters, facilitated by a computer vision model.

14. The method of claim 13, further comprising activating an alarm based at least in part on the drag risk score.

15. The method of claim 14, further comprising determining a collision risk score based at least in part on the drag risk score.

16. The method of claim 15, further comprising activating an alarm based at least in part on the drag risk score and the collision risk score.

17. The method of claim 16, further comprising displaying the drag risk score on a management device.

18. The method of claim 17, wherein the one or more anchor parameters include an anchor chain angle.

19. The method of claim 18, wherein the determination of the drag risk score is based at least in part on a geo-location of the vessel.

20. The method of claim 19, wherein the monitoring system and the management device are communicatively coupled through a long range (LoRa) radio communication interface.

* * * * *